(12) United States Patent
Yeo et al.

(10) Patent No.: US 11,444,729 B2
(45) Date of Patent: Sep. 13, 2022

(54) TRANSMITTING FEEDBACK FOR DATA TRANSMISSION THROUGH A SIDELINK

(71) Applicant: Samsung Electronics Co., Ltd., Suwon-si (KR)

(72) Inventors: Jeongho Yeo, Suwon-si (KR); Hyunseok Ryu, Suwon-si (KR); Cheolkyu Shin, Suwon-si (KR); Sungjin Park, Suwon-si (KR); Jinyoung Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 91 days.

(21) Appl. No.: 16/946,414

(22) Filed: Jun. 19, 2020

(65) Prior Publication Data
US 2020/0403737 A1 Dec. 24, 2020

(30) Foreign Application Priority Data
Jun. 21, 2019 (KR) .......................... 10-2019-0073906

(51) Int. Cl.
*H04L 1/18* (2006.01)
*H04W 52/36* (2009.01)
*H04W 72/04* (2009.01)

(52) U.S. Cl.
CPC ......... *H04L 1/1861* (2013.01); *H04W 52/367* (2013.01); *H04W 72/04* (2013.01)

(58) Field of Classification Search
CPC ................. H04L 1/1861; H04L 1/0001; H04L 1/1819; H04L 1/1893; H04L 5/0053; H04L 5/00;

(Continued)

(56) References Cited

U.S. PATENT DOCUMENTS

| 2019/0052436 A1 | 2/2019 | Desai et al. |
| 2020/0205166 A1* | 6/2020 | Huang ............... H04W 72/0446 |
| 2020/0295883 A1* | 9/2020 | Lee ....................... H04L 1/1893 |

OTHER PUBLICATIONS

Intel Corporation, "Physical layer procedures for NR V2X sidelink communication", 3GPP TSG RAN WG1 Meeting #97, May 13-17, 2019, R1-1906799, 14 pages.

(Continued)

*Primary Examiner* — Ian N Moore
*Assistant Examiner* — Brian T Le

(57) ABSTRACT

The disclosure relates to a communication technique and system for converging a 5G communication system for supporting a higher data transfer rate beyond a 4G system with an IoT technology. The disclosure relates to a method performed by a terminal for feeding back a hybrid automatic repeat request (HARQ) and to a terminal for performing the method, including: generating HARQ feedback information for data that is scheduled for the terminal in at least one slot; determining a transmission timing of the HARQ feedback information based on a minimum processing time for transmission of a physical sidelink feedback channel (PSFCH) of the terminal; and transmitting the HARQ feedback information based on the determined timing, wherein the minimum processing time for the PSFCH transmission is determined based on at least one of a subcarrier spacing, a configuration of a resource pool, and a time interval between a PSSCH and the PSFCH.

20 Claims, 36 Drawing Sheets

(58) Field of Classification Search
CPC .. H04L 5/0055; H04W 52/367; H04W 72/04; H04W 72/12; H04W 16/06; H04W 36/06; H04B 7/024
See application file for complete search history.

(56) References Cited

OTHER PUBLICATIONS

LG Electronics, "Discussion on physical layer procedures for NR sidelink", 3GPP TSG RAN WG1 Meeting #97, May 13-17, 2019, R1-1907018, 11 pages.
Spreadtrum Communications, "Discussion on physical layer procedures for sidelink", 3GPP TSG RAN WG1 #97, May 13-17, 2019, R1-1906362, 8 pages.
Intel Corporation, "Sidelink Physical Structure for NR V2X Communication", 3GPP TSG RAN WG1 Meeting #97, May 13-17, 2019, R1-1906794, 20 pages.
International Search Report dated Sep. 25, 2020 in connection with International Patent Application No. PCT/KR2020/008038, 3 pages.
Written Opinion of the International Searching Authority dated Sep. 25, 2020 in connection with International Patent Application No. PCT/KR2020/008038, 4 pages.
European Patent Office, "Supplementary European Search Report" dated Jul. 15, 2022, in connection with European Patent Application No. 20826466.3, 12 pages.
Xiaomi Communications, "On Physical layer procedures for V2x communications," 3GPP TSG RAN WG1 Ad-Hoc Meeting 1901, R1-1901017, Taipei, Jan. 21-25, 2019, 4 pages.
Huawei et al., "HARQ enhancements in NR unlicensed," 3GPP TSG RAN WGI Meeting #95, RI-1812196, Spokane, USA, Nov. 12-16, 2018, 13 pages.
Samsung, "On Sidelink Feedback Channel Format," 3GPP TSG RAN WG1 #97, R1-1906947, Reno, USA, May 13-17, 2019, 6 pages.

* cited by examiner

FIG. 17

| LOGICAL SLOT INDEX IN RESOURCE POOL | 1 | 2 | 3 | | 4 | 5 | 6 | | | | 7 | | | | 8 | 9 | 10 | 11 | 12 | 13 |
|---|---|---|---|---|---|---|---|---|---|---|---|---|---|---|---|---|---|---|---|---|
| Slot | n-2 | n-1 | n | n+1 | n+2 | n+3 | n+4 | n+5 | n+6 | n+7 | n+8 | n+9 | n+10 | n+11 | n+12 | n+13 | n+14 | n+15 | n+16 |
| Whether to correspond to resource pool | 0 | 0 | 0 | X | 0 | 0 | 0 | X | X | X | 0 | X | X | 0 | 0 | 0 | 0 | 0 | 0 |
| Whether PSFCH transmission is available | 0 | X | 0 | X | | 0 | X | X | X | X | 0 | X | X | X | 0 | X | X | 0 | |
| Slot to which PSSCH corresponding to HARQ-ACK feedback that needs to be included in PSFCH has been transmitted | | | n-2 | | | N | | | | | n+3 | | | | n+8 | | | n+12 | n+14 |
| | | | n-1 | | | n+2 | | | | | n+4 | | | | n+11 | | | n+13 | n+15 |

FIG. 18

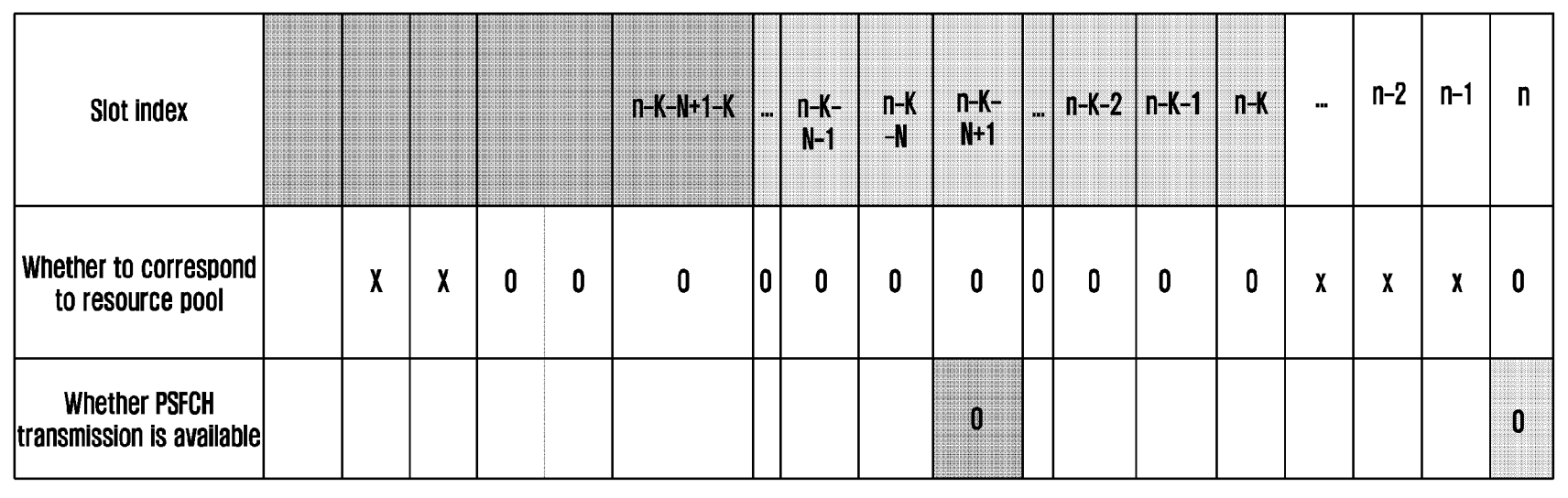

| Slot Index | | | | | | | | | | | | | | | | | | |
|---|---|---|---|---|---|---|---|---|---|---|---|---|---|---|---|---|---|---|
| | | | | n-K-N+1-K | ... | n-K-N-1 | n-K-N | n-K-N+1 | ... | n-K-2 | n-K-1 | n-K | ... | n-2 | n-1 | n | | |
| Whether to correspond to resource pool | x | x | o | o | o | o | o | o | o | o | o | o | x | x | x | o | | |
| Whether PSFCH transmission is available | | | | | | | | o | | | | | | | | o | | |

FIG. 19

| LOGICAL SLOT INDEX IN RESOURCE POOL | 1 | 2 | 3 | | 4 | 5 | 6 | | | | 7 | | | | 8 | 9 | 10 | 11 | 12 | 13 |
|---|---|---|---|---|---|---|---|---|---|---|---|---|---|---|---|---|---|---|---|---|
| Slot | n-2 | n-1 | n | n+1 | n+2 | n+3 | n+4 | n+5 | n+6 | n+7 | n+8 | n+9 | n+10 | n+11 | n+12 | n+13 | n+14 | n+15 | n+16 |
| Whether to correspond to resource pool | 0 | 0 | 0 | X | 0 | 0 | 0 | X | X | X | 0 | X | X | 0 | 0 | 0 | 0 | 0 | 0 |
| Whether PSFCH transmission is available | 0 | X | 0 | X | X | 0 | X | X | X | X | 0 | X | X | X | X | X | 0 | X | 0 |
| Slot to which PSSCH corresponding to HARQ-ACK feedback that needs to be included in PSFCH has been transmitted | | | n-2 | | | n-1 | | | | | n+2 | | | | n+8 | | n+11 | | n+13 |
| | | | | | | n | | | | | n+3 | | | | | | n+12 | | n+14 |
| | | | | | | | | | | | n+4 | | | | | | | | |

FIG. 20

| LOGICAL SLOT INDEX IN RESOURCE POOL | 1 | 2 | | 3 | 4 | 5 | 6 | | 7 | | | | | | | | | | |
|---|---|---|---|---|---|---|---|---|---|---|---|---|---|---|---|---|---|---|---|
| Slot | n-2 | n-1 | n | n+1 | n+2 | n+3 | n+4 | n+5 | n+6 | n+7 | n+8 | n+9 | n+10 | n+11 | n+12 | n+13 | n+14 | n+15 | n+16 |
| Whether to correspond to resource pool | 0 | 0 | X | 0 | 0 | 0 | 0 | 0 | X | X | 0 | X | X | 0 | 0 | 0 | 0 | 0 | 0 |
| Whether PSFCH transmission is available | X | 0 | X | X | 0 | X | 0 | X | X | X | 0 | X | X | X | 0 | X | 0 | X | 0 |
| Slot to which PSSCH corresponding to HARQ-ACK feedback that needs to be included in PSFCH has been transmitted | | | | | n-2 | n+1 | | | | | n+2 | | | | n+8 | | n+11 | | n+12 |
| | | | | | n-1 | | | | | | n+3 | | | | | | n+12 | | n+13 |
| | | | | | | | | | | | n+4 | | | | | | | | |
| | | | | | | | | | | | n+5 | | | | | | | | |

FIG. 21

| LOGICAL SLOT INDEX IN RESOURCE POOL | 1 | 2 | | 3 | 4 | 5 | 6 | 7 | 8 | | | | 9 | 10 | 11 | 12 | 13 |
|---|---|---|---|---|---|---|---|---|---|---|---|---|---|---|---|---|---|
| Slot | n-2 | n-1 | n | n+1 | n+2 | n+3 | n+4 | n+5 | n+6 | n+7 | n+8 | n+9 | n+10 | n+11 | n+12 | n+13 | n+14 | n+15 | n+16 |
| Whether to correspond to resource pool | 0 | 0 | X | 0 | 0 | 0 | 0 | 0 | 0 | X | X | X | X | X | 0 | 0 | 0 | 0 | 0 |
| Whether PSFCH transmission is available | 0 | X | X | X | X | 0 | X | X | X | X | X | X | X | X | 0 | X | X | X | 0 |
| Slot to which PSSCH corresponding to HARQ-ACK feedback that needs to be included in PSFCH has been transmitted | | | | | | | n-2 | | | | | | | | n+1 | | | | n+12 |
| | | | | | | | n-1 | | | | | | | | n+2 | | | | n+13 |
| | | | | | | | n | | | | | | | | n+3 | | | | |
| | | | | | | | | | | | | | | | n+4 | | | | |
| | | | | | | | | | | | | | | | n+5 | | | | |
| | | | | | | | | | | | | | | | n+6 | | | | |

FIG. 22

| LOGICAL SLOT INDEX IN RESOURCE POOL | 1 | 2 | | 3 | 4 | 5 | 6 | | | | 7 | 8 | 9 | 10 | 11 | 12 | 13 |
|---|---|---|---|---|---|---|---|---|---|---|---|---|---|---|---|---|---|
| Slot | n-2 | n-1 | n | n+1 | n+2 | n+3 | n+4 | n+5 | n+6 | n+7 | n+8 | n+9 | n+10 | n+11 | n+12 | n+13 | n+14 | n+15 | n+16 |
| Whether to correspond to resource pool | 0 | 0 | X | 0 | 0 | 0 | 0 | 0 | X | X | X | X | 0 | 0 | 0 | 0 | 0 | 0 |
| Whether PSFCH transmission is available | X | 0 | X | X | 0 | X | 0 | X | X | X | X | X | 0 | X | 0 | X | 0 |
| Slot to which PSSCH corresponding to HARQ-ACK feedback that needs to be included in PSFCH has been transmitted | | | | | n-2 | | n+1 | | | | | | n+2 | | n+10 | | n+12 |
| | | | | | n-1 | | | | | | | | n+3 | | n+11 | | n+13 |
| | | | | | | | | | | | | | n+4 | | | | |
| | | | | | | | | | | | | | n+5 | | | | |

| LOGICAL SLOT INDEX IN RESOURCE POOL | 1 | 2 | 3 | 4 | 5 | 6 | 7 | 8 | 9 | 10 | 11 | 12 | 13 |
|---|---|---|---|---|---|---|---|---|---|---|---|---|---|
| Slot | n-2 | n-1 | n | n+1 | n+2 | n+3 | n+4 | n+5 | n+6 | n+7 | n+8 | n+9 | n+10 | n+11 | n+12 | n+13 | n+14 | n+15 | n+16 |
| Whether to correspond to resource pool | 0 | 0 | 0 | X | 0 | 0 | 0 | 0 | 0 | X | 0 | X | 0 | 0 | 0 | 0 | 0 | 0 | 0 |
| Whether PSFCH transmission is possible | X | X | 0 | X | X | X | X | X | X | X | X | X | X | X | X | X | X | X |
| Slot to which PSSCH corresponding to HARQ-ACK feedback that needs to be included in PSFCH has been transmitted | | | n-2 | | | | | | | | | | | | PSFCH n+4 (2401) | | PSFCH n+3,n+2 (2403) | | PSFCH n,n-1 (2405) | | | | n+8 n+12 n+13 | | | |
| Number of HARQ-ACK bits | | | | | | | | 5 | | | 3 | | |

TRANSMITTING FEEDBACK FOR DATA TRANSMISSION THROUGH A SIDELINK

CROSS-REFERENCE TO RELATED APPLICATION

This application is based on and claims priority under 35 U.S.C. 119 to Korean Patent Application No. 10-2019-0073906, filed on Jun. 21, 2019, in the Korean Intellectual Property Office, the disclosure of which is herein incorporated by reference in its entirety.

BACKGROUND

1. Field

The disclosure relates to a communication system and, particularly, to a method and apparatus for transmitting feedback for data transmission through a sidelink. More specifically, the disclosure relates to a method for configuring a HARQ-ACK codebook, a method for determining feedback information to be transmitted, a method for determining a timing for feedback transmission, and a method and apparatus for transmitting a side link physical feedback channel including feedback in the case where data is transmitted through a sidelink and a reception terminal transmits HARQ-ACK information for the data to a terminal that has transmitted the data. The disclosure can be applied to the case where HARQ-ACK feedback is activated between transmission and reception terminals in sidelink communication.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mm Wave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The above information is presented as background information only to assist with an understanding of the disclosure. No determination has been made, and no assertion is made, as to whether any of the above might be applicable as prior art with regard to the disclosure.

SUMMARY

In a wireless communication system, more particularly, in a new radio (NR) system, according to data transmission from a transmission terminal to a reception terminal, the reception terminal may receive data and then transmit HARQ-ACK feedback information about the corresponding data to the transmission terminal. For example, in downlink data transmission, a terminal transmits HARQ-ACK feedback information for data, transmitted from a base station, to the base station via a configured resource. In sidelink data transmission, a reception terminal may transmit HARQ-ACK feedback to a transmission terminal. The HARQ-ACK feedback may be used as information for retransmission, which is determined by the transmission terminal. A physical sidelink feedback channel (PSFCH) may be used as a physical channel, which is used by the reception terminal in order to transmit HARQ-ACK feedback. Since all the slots of the sidelink may not include resources via which the PSFCH is transmitted, the reception terminal needs to transmit pieces of HARQ-ACK feedback information for multiple pieces of data (physical sidelink shared channels (PSSCHs)) via one PSFCH. In this situation, the disclosure provides a method and apparatus for transmitting HARQ-ACK feedback in device to device communication.

An embodiment may provide a method for feeding back a hybrid automatic repeat request (HARQ) by a terminal, the method including: generating HARQ feedback information for data that is scheduled for the terminal in at least one slot; determining a transmission timing of the HARQ feedback information based on a minimum processing time for transmission of a physical sidelink feedback channel (PSFCH) of the terminal; and transmitting the HARQ feedback information based on the determined timing, wherein the minimum processing time for the PSFCH transmission is determined based on at least one of a subcarrier spacing, configuration of a resource pool, and a time interval between a PSSCH and the PSFCH.

In addition, an embodiment may provide a terminal for feeding back a hybrid automatic repeat request (HARQ), the terminal including: a transceiver; and a controller configured to generate HARQ feedback information for data that is scheduled for the terminal in at least one slot, to determine a transmission timing of the HARQ feedback information based on a minimum processing time for transmission of a physical sidelink feedback channel (PSFCH) of the terminal, and to transmit, via the transceiver, the HARQ feedback information based on the determined timing, wherein the minimum processing time for the PSFCH transmission is determined based on at least one of a subcarrier spacing, a configuration of a resource pool, and a time interval between a PSFCH and a PSFCH.

An embodiment may provide a method and apparatus for transmission or reception of sidelink feedback in a communication system. In addition, according to an embodiment, a reception terminal may transmit HARQ-ACK feedback to a transmission terminal through a sidelink.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the disclosure and its advantages, reference is now made to the following description taken in conjunction with the accompanying drawings, in which like reference numerals represent like parts:

FIG. 17 illustrates an example in which a terminal determines a slot for transmitting HARQ-ACK feedback;

FIG. 18 illustrates the maximum number of HARQ-ACK feedback bits, which needs to be transmitted by a terminal through one PSFCH;

FIG. 19 illustrates another example in which a terminal determines a slot for transmitting HARQ-ACK feedback;

FIG. 20 illustrates still another example in which a terminal determines a slot for transmitting HARQ-ACK feedback;

FIG. 21 illustrates still further another example in which a terminal determines a slot for transmitting HARQ-ACK feedback;

FIG. 22 illustrates further yet another example in which a terminal determines a slot for transmitting HARQ-ACK feedback;

FIG. 24 illustrates a method for transmitting feedback information by including the same in a PSFCH according to whether physical slots are included in a resource pool and a position of a slot for which a PSFCH resource is configured;

DETAILED DESCRIPTION

Figure 1:
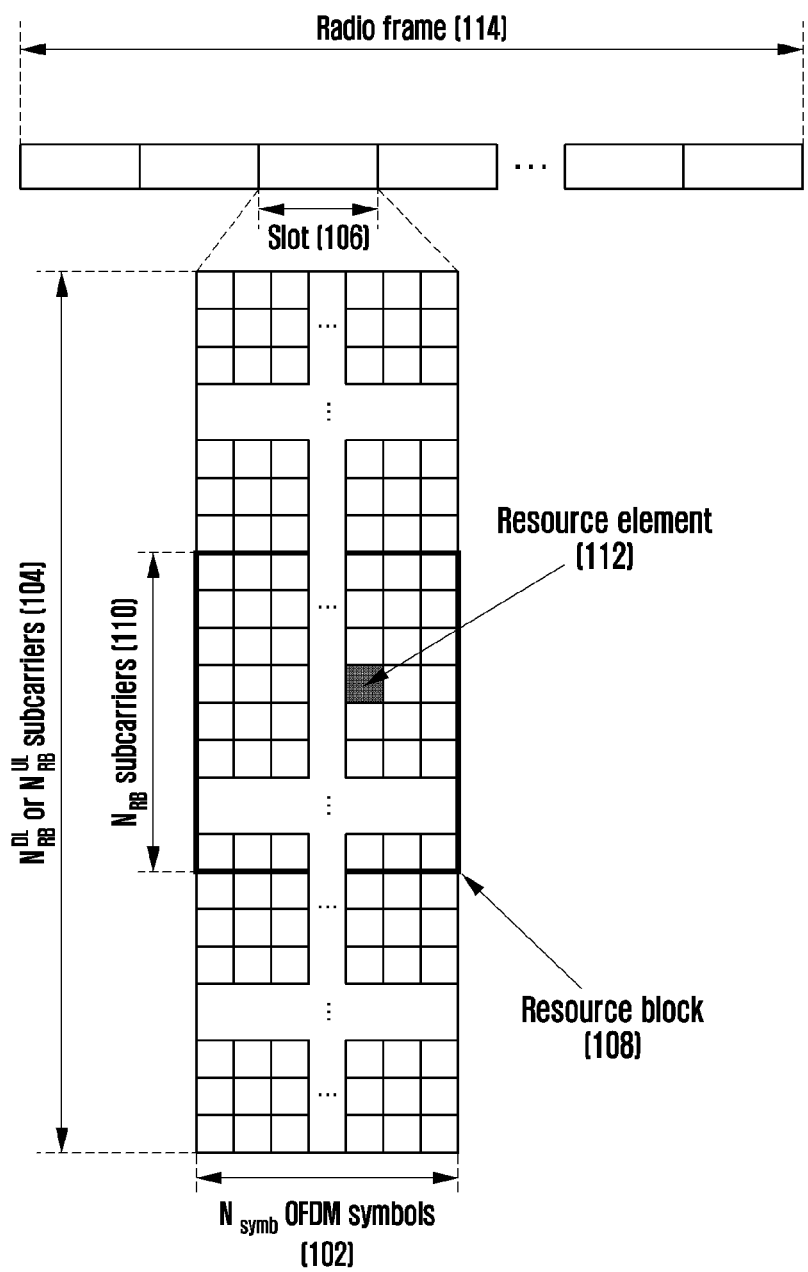
FIG. 1 illustrates a basic structure of a time-frequency domain, which is a radio resource domain in which data or a control channel is transmitted in a downlink or uplink in an NR system.

FIGS. 1 through 28, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

A new radio access technology (NR), which is a new 5G communication, is designed such that various services can be freely multiplexed in a time and a frequency resource, thereby enabling waveform/numerology, a reference signal, and the like to be dynamically or freely allocated according to a need of the corresponding service. In order to provide an optimal service to a terminal in wireless communication, it is important to transmit optimized data based on a channel quality and measurement of an interference amount, and accordingly, accurate channel state measurement is essential. However, unlike the 4G communication in which channel and interference characteristics are not greatly changed depending on frequency resources, the 5G channel has channel and interference characteristics greatly changed depending on services, and as a result, there is a need to support a subset of frequency resource group (FRG) that can measure the channel and interference characteristics separately. Meanwhile, in the NR system, a kind of supported services may be classified into categories such as enhanced mobile broadband (eMBB), massive machine type communications (mMTC), ultra-reliable and low-latency communications (URLLC) or the like. The eMBB may be considered as a service aiming at a high speed transmission of high-capacity data, the mMTC may be considered as a service aiming at terminal power minimization and an access of multiple terminals, and the URLLC may be considered as a service aiming at high reliability and low latency. Different requirements may be applied depending on a type of services applied to the terminal.

As described above, a plurality of services can be provided to a user in the communication system, and a method capable of providing each service within the same time interval according to characteristics in order to provide a plurality of services to users and an apparatus using the same are required.

Hereinafter, exemplary embodiments of the disclosure will be described in detail with reference to the accompanying drawings.

In describing the exemplary embodiments of the disclosure, descriptions related to technical contents which are well-known in the art to which the disclosure pertains, and are not directly associated with the disclosure, will be omitted. Such omission of unnecessary descriptions is intended to prevent obscuring of the main idea of the disclosure in order to more clearly convey the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block in the flowchart illustrations and combinations of blocks in the flowchart illustrations can be implemented by computer program instructions. These computer program instructions can be provided to a processor of a general-purpose computer, special-purpose computer, or other programmable data processing apparatus to produce a machine such that the instructions executed via the processor of the computer or other programmable data processing apparatus, generate means for implementing the functions specified in the flowchart block or blocks. These computer program instructions may also be stored in a computer-usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Additionally, each block of the flowchart illustrations may represent a module, segment, or portion of code that includes one or more executable instructions for implementing the specified logical function(s). It should also be noted that in some alternative implementations, the functions noted in the blocks may occur out of the order shown. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, "unit" does not always have a meaning limited to software or hardware. The "unit" may be constructed either to be stored in an addressable storage medium or to be executed on one or more processors. Therefore, the "unit" includes, for example, software elements, object-oriented software elements, class elements or task elements, processes, functions, properties, procedures, sub-routines, segments of program code, drivers, firmware, micro-codes, circuits, data, databases, data structures, tables, arrays, and parameters. The elements and functions provided by the "unit" may be either combined into a smaller number of elements, "units" or divided into a larger number of elements or "units". Moreover, the elements or "units" may be implemented to be reproduced on one or more CPUs within a device or a security multimedia card. Also, in an embodiment, the "unit" may include one or more processors.

A wireless communication system has developed into a broadband wireless communication system that provides high-speed and high-quality packet data service according to the communication standards such as High-Speed Packet Access (HSPA) of 3GPP, Long-Term Evolution (LTE) or evolved universal terrestrial radio access (E-UTRA), LTE-advanced (LTE-A), High Rate Packet Data (HRPD) of 3GPP2, Ultra Mobile Broadband (UMB), and 802.16e of IEEE, or the like, beyond the voice-based service provided initially. Also, a communication standard of 5G or new radio (NR) is being developed as a 5G wireless communication system.

The NR system, as a representative example of the broadband wireless communication system, employs an orthogonal frequency-division multiplexing (OFDM) scheme in the downlink (DL) and in the uplink (UL). More specifically, the NR system uses a cyclic-prefix OFDM (CP-OFDM) scheme in the downlink (DL) and a discrete Fourier transform spreading OFDM (DFT-S-OFDM) scheme together with the CP-OFDM in the uplink (UL). The term "uplink" denotes a radio link for transmitting data or control signals from a terminal (a user equipment (UE) or a mobile station (MS)) to a base station (gNode B or BS), and the term "downlink" denotes a radio link for transmitting data or control signals from a base station to a terminal. In the multiple access schemes described above, time-frequency resources for carrying data or control information are allocated and operated in a manner to prevent overlapping of the resources, i.e. to establish orthogonality between users so as to identify data or control information of each user.

If decoding failure occurs in the initial transmission, the NR system employs hybrid automatic repeat request (HARQ) scheme for retransmitting the corresponding data in a physical layer. A HARQ scheme is designed to operate in such a way that if a receiver fails to accurately decode data, the receiver transmits information, that is, a negative acknowledgement (NACK), indicative of the decoding failure, thus enabling the transmitter to retransmit the corresponding data in the physical layer. The receiver may combine data retransmitted from the transmitter and previous data, decoding of which fails, whereby data reception performance may increase. Also, if the receiver accurately decodes data, the receiver transmits information (ACK) reporting that decoding is successfully executed, so that the transmitter transmits new data.

FIG. 1 illustrates a basic structure of a time-frequency domain, which is a radio resource region in which data or a control channel is transmitted in the downlink or the uplink of an NR system.

Referring to FIG. 1, a horizontal axis indicates a time domain, and a vertical axis indicates a frequency domain. The minimum transmission unit in the time domain is an OFDM symbol, and Nsymb number of OFDM symbols 102 may be collected to configure one slot 106. The length of the subframe may be defined by 1.0 ms, and the radio frame 114 may be defined by 10 ms. The minimum transmission unit in the frequency domain is a subcarrier, and the bandwidth of an entire system transmission bandwidth may be configured by a total NBW number of subcarriers 104.

In the time-frequency domain, the basic unit of resource is a resource element (RE) 112, and the RE may be expressed by an OFDM symbol index and a subcarrier index. A resource block (RB or physical resource block (PRB)) 108 is defined by Nsymb number of consecutive OFDM symbols 102 in the time domain and NRB number of consecutive subcarriers 110 in the frequency domain. Accordingly, one RB 108 is configured by Nsymb×NRB number of REs 112. In general, the minimum transmission unit of data is the unit of RB. In the NR system, in general, Nsymb is 14, NRB is 12, and NBW and NRB are proportional to the bandwidth of a system transmission band. In addition, a data rate may increase in proportion to the number of RBs scheduled to a terminal.

In the case of an FDD system in which downlink and uplink are divided by frequency and operated in the NR system, the downlink transmission bandwidth and the uplink transmission bandwidth may differ from each other. A channel bandwidth may indicate an RF bandwidth corresponding to a system transmission bandwidth. <Table 1> and <Table 2> show a part of the correspondence among a system transmission bandwidth, a subcarrier spacing, and a channel bandwidth, defined in the NR system, in a frequency band lower than 6 GHz and in a frequency band higher than 6 GHz, respectively. For example, in the NR system having a channel bandwidth of 100 MHz and having a subcarrier spacing of 30 kHz, a transmission bandwidth may include 273 RBs. In Table 1 and Table 2 below, N/A may indicate a bandwidth-subcarrier combination, which the NR system does not support.

TABLE 1

Configuration of Frequency range 1 (FR1)

| Channel bandwidth $BW_{Channel}$ [MHz] | Subcarrier spacing | 5 MHz | 10 MHz | 20 MHz | 50 MHz | 80 MHz | 100 MHz |
|---|---|---|---|---|---|---|---|
| Transmission bandwidth configuration $N_{RB}$ | 15 kHz | 25 | 52 | 106 | 270 | N/A | N/A |
| | 30 kHz | 11 | 24 | 51 | 133 | 217 | 273 |
| | 60 kHz | N/A | 11 | 24 | 65 | 107 | 135 |

TABLE 2

Configuration of Frequency range 2 (FR2)

| Channel bandwidth $BW_{Channel}$ [MHz] | Subcarrier spacing | MHz | 100 MHz | 200 MHz | 400 MHz |
|---|---|---|---|---|---|
| Transmission bandwidth configuration $N_{RB}$ | 60 kHz | 66 | 132 | 264 | N/A |
| | 120 kHz | 32 | 66 | 132 | 264 |

The frequency range in the NR system may be divided and defined by FR1 and FR2, as in <Table 3> below.

TABLE 3

| Frequency range designation | Corresponding frequency range |
|---|---|
| FR1 | 450 MHz-7125 MHz |
| FR2 | 24250 MHz-52600 MHz |

In the above, the ranges of FR1 and FR2 may be differently applied. For example, the frequency range of FR1 can be changed from 450 MHz to 6000 MHz.

In the NR system, scheduling information for downlink data or uplink data may be transmitted from a base station to a terminal through downlink control information (DCI). The DCI is defined according to various formats, and each format may be determined according to whether the DCI is scheduling information (UL grant) for uplink data or scheduling information (DL grant) for downlink data, whether the DCI is a compact DCI having a small amount of control information, whether or not spatial multiplexing using multiple antennas is applied, and whether or not the DCI is for power control. For example, DCI format 1-1, which is scheduling control information (DL grant) for downlink data, may include at least one of the following control information.

Carrier indicator, which indicates a frequency carrier at which transmission is performed.

DCI format indicator, which is an indicator distinguishing whether the corresponding DCI is for downlink or uplink.

Bandwidth part indicator, which indicates a BWP in which transmission is performed.

Frequency domain resource assignment, which indicates an RB of a frequency domain assigned for data transmission. Resources to be expressed are determined according to a system bandwidth and a resource allocation method.

Time-domain resource assignment, which indicates an OFDM symbol of a slot from which data-related channel is transmitted.

VRB-to-PRB mapping, which indicates a mapping scheme between a virtual RB (VRB) index and a physical RB (PRB) index.

Modulation and coding scheme (MCS), which indicates a modulation scheme used for data transmission and the size of a transport block, which is data to be transmitted.

HARQ process number, which indicates a number of a HARQ process.

New data indicator, which indicates whether HARQ transmission is initial transmission or retransmission.

Redundancy version, which indicates the redundancy version of HARQ.

Transmit power control (TPC) command for a physical uplink control channel (PUCCH), which indicates a transmission power control command for a PUCCH which is an uplink control channel.

In a case of data transmission through the PDSCH or PUSCH, time domain resource assignment may be transmitted via information about a slot to which a PDSCH/PUSCH is transmitted, a start symbol position S in the corresponding slot, and the number L of symbols to which the PDSCH/PUSCH is mapped. Here, S may be a relative position from the start of a slot, L may be the number of consecutive symbols, and S and L may be determined based on a start and length indicator value (SLIV) defined as follows.

```
if (L −1) ≤ 7 then
    SLIV =14·(L −1) + S
else
    SLIV =14·(14 − L +1) + (14 −1 − S)
    where 0 < L ≤ 14 − S
```

The NR system may receive, through RRC configuration, configuration of a table in which an SLIV value, a PDSCH/PUSCH mapping type, and information on a slot to which the PDSCH/PUSCH is transmitted are included in one row (for example, information described above may be included in the form of a table). Subsequently, in the time domain resource assignment of the DCI, by indicating an index value in the table configured as above, a base station may transmit, to a terminal, the SLIV value, the PDSCH/PUSCH mapping type, and information on the slot to which the PDSCH/PUSCH is transmitted.

In the NR system, the PDSCH mapping type is defined by type A and type B. In the PDSCH mapping type A, the first symbol among DMRS symbols is located at the second or the third OFDM symbol in a slot. In the PDSCH mapping type B, the first symbol among DMRS symbols is located at the first OFDM symbol in a time domain resource assigned via PUSCH transmission.

The DCI may be subjected to a channel coding and modulation process, and may then be transmitted through a physical downlink control channel (PDCCH), which is a downlink physical control channel. In the disclosure, transmission of control information via a PDCCH or a PUCCH may be expressed as transmission of the PDCCH or the PUCCH. Similarly, transmission of data via a PUSCH or a PDSCH can be expressed as transmission of the PUSCH or the PDSCH.

Generally, the DCI is scrambled with a specific radio network temporary identifier (RNTI) (or a terminal identifier), independently for each terminal, a cyclic redundancy identify (CRC) is added thereto, and channel coding is performed, whereby each independent PDCCH is configured and transmitted. The PDCCH is mapped and transmitted in a control resource set (CORESET) configured for a terminal.

The downlink data may be transmitted through a physical downlink shared channel (PDSCH) serving as a physical channel for downlink data transmission. The PDSCH may be transmitted after a control channel transmission interval, and scheduling information, such as a specific mapping position and modulation scheme, in the frequency domain may be determined based on DCI transmitted through the PDCCH.

Through an MCS among control information included in the DCI, a base station may notify a terminal of a modulation scheme applied to a PDSCH to be transmitted, and the size (transport block size (TBS)) of data to be transmitted. In an embodiment, the MCS may be configured by 5 bits or more or fewer bits. The TBS corresponds to the size of data (transport block, TB) that the base station desires to transmit, before channel coding for error correction is applied to the data.

In the disclosure, a transport block (TB) may include a medium access control (MAC) header, a MAC control element (CE), one or more MAC service data units (SDUs), and padding bits. According to another embodiment, the TB may indicate the unit of data, which is dropped from a MAC layer to a physical layer, or a MAC protocol data unit (MAP PDU).

The modulation schemes supported by the NR system are quadrature phase shift keying (QPSK), 16 quadrature amplitude modulation (16 QAM), 64 QAM, and 256 QAM, and modulation orders (Qm) of the QPSK, 16 QAM, 64 QAM, and 256 QAM correspond to 2, 4, 6, and 8, respectively. That is, 2 bits per symbol in the case of QPSK modulation, 4 bits per symbol in the case of 16 QAM modulation, 6 bits per symbol in the case of 64 QAM modulation, and 8 bits per symbol in the case of 256 QAM modulation may be transmitted.

Figure 2:
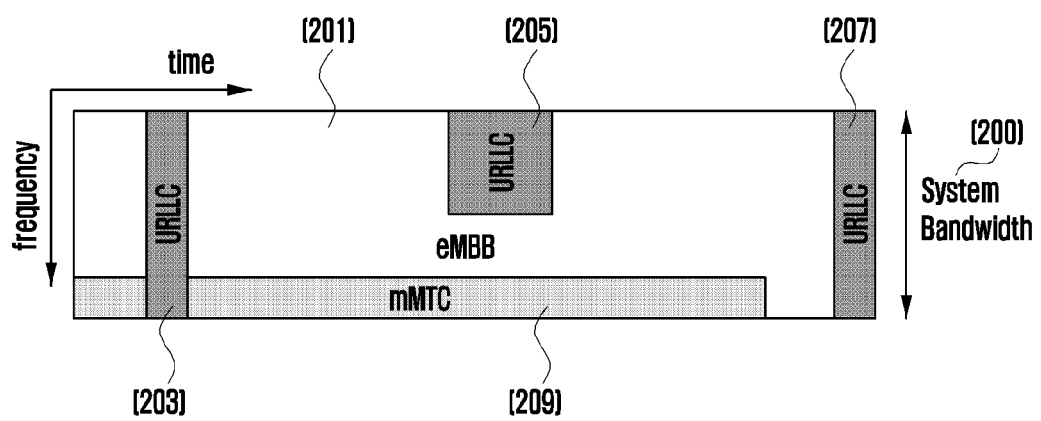
FIG. 2 illustrates an example in which a frequency and a time resource are allocated for information transmission in an NR system.
Figure 3A:
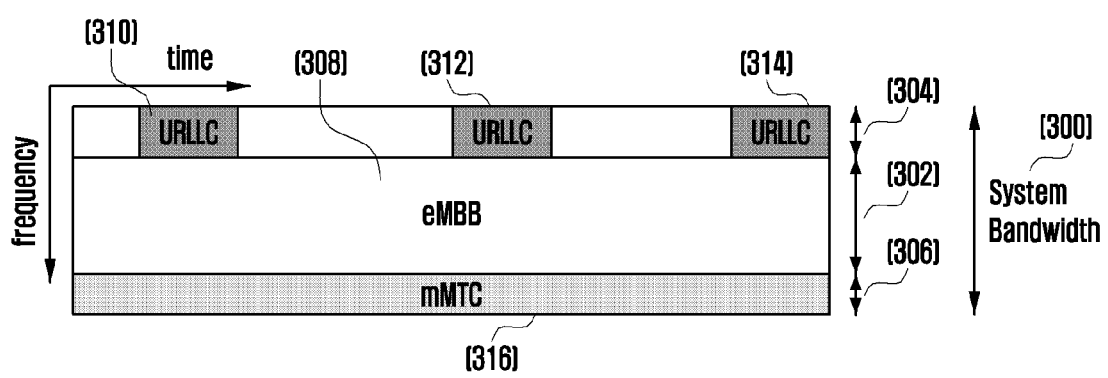
FIG. 3A illustrates another example in which a frequency and a time resource are allocated for information transmission in an NR system.

FIG. 2 illustrates an aspect in which pieces of data for eMBB, URLLC, and mMTC, which are services considered in the 5G or NR system, are allocated in frequency-time resources. FIG. 3A illustrates an aspect in which pieces of data for eMBB, URLLC, and mMTC, which are services considered in the 5G or NR system, are allocated in frequency-time resources.

Referring to FIGS. 2 and 3A, a scheme, in which frequency and time resources are allocated for performing information transmission in each system, may be identified.

First, FIG. 2 illustrates an example in which pieces of data for eMBB, URLLC, and mMTC are allocated in the entire system frequency bandwidth 200. In the middle of allocating eMBB data 201 and mMTC data 209 in a specific frequency bandwidth and performing transmission thereof, if URLLC data 203, 205, and 207 are generated and transmission of the URLLC data 203, 205, and 207 is necessary, the URLLC data 203, 205, and 207 may be transmitted without emptying a portion in which the eMBB data 201 and the mMTC data 209 have been already allocated and without transmitting the same. Since the URLLC needs to reduce a delay time in the middle of performing the services described above, the URLLC data 203, 205, and 207 may be allocated to a portion of a resource 201 to which the eMBB data is allocated, and thus may be transmitted. Of course, in a case where the URLLC data 203, 205, and 207 are additionally allocated and transmitted in the resource to which the eMBB data is allocated, eMBB data may not be transmitted in an overlapping frequency-time resource, and thus the transmission performance of the eMBB data may be lowered. That is, in the above case, eMBB data transmission failure due to URLLC data allocation may occur.

FIG. 3A illustrates an example in which a service and data are transmitted in each of sub-bands 302, 304, and 306, obtained by dividing the entire system frequency bandwidth 300. Information associated with sub-band configuration may be predetermined, and the information may be transmitted to a terminal by a base station via higher layer signaling. Alternatively, the information associated with the sub-band may be arbitrarily divided by a base station or a network node and services may be provided to the terminal without transmitting separate pieces of sub-band configuration information. FIG. 3A illustrates an aspect in which a sub-band 302 is used for transmission of eMBB data, a sub-band 304 is used for transmission of URLLC data, and a sub-band 306 is used for transmission of mMTC data.

Throughout the embodiment, the length of a transmission time interval (TTI) used for URLLC data transmission may be shorter than the length of TTI used for eMBB data or mMTC data transmission. In addition, the response of information related to the URLLC data may be transmitted faster than that of eMBB data or mMTC data, and accordingly information transmission or reception having a low delay may be performed. The structures of physical layer channels used for transmission of the above described three types of services or data may be different from each other. For example, at least one of the length of a transmission time interval (TTI), the allocation unit of frequency resources, a structure of a control channel, and a data mapping method may be different.

In the above, three types of services and three types of data are described, but more types of services and corresponding data may exist, and in this case, the contents of the disclosure may be applied.

In order to explain a method and apparatus proposed in the disclosure, the terms "physical channel" and "signal" in the NR system may be used. However, details of the disclosure may be applied to a wireless communication system other than the NR system.

Hereinafter, embodiments of the disclosure will be described in detail with the accompanying drawings. In addition, in describing the disclosure, if it is determined that a detailed description of a related function or configuration may unnecessarily obscure the subject matter of the disclosure, the detailed description will be omitted. In addition, terms to be described later are terms defined in consideration of functions in the disclosure, which may vary according to a user's or operator's intention or practice. Therefore, the definition should be made based on the contents throughout this specification. Hereinafter, a sidelink (SL) refers to a signal transmission/reception path between the terminal and the terminal, which may be interchangeably used with the PC5 interface. Hereinafter, a base station is a subject that performs resource allocation of a terminal, and may be a base station supporting both V2X communication and general cellular communication, or a base station supporting only V2X communication. That is, the base station may denote an NR base station (gNB), an LTE base station (eNB), or a road site unit (RSU) (or fixed station). The terminal may include a general user equipment, a mobile station, as well as a vehicle supporting vehicle-to-vehicle communication (vehicular-to-vehicular, V2V), a vehicle supporting vehicle-to-pedestrian (V2P), pedestrian handsets (e.g. smartphones), a vehicle that supports vehicular-to-network communication (V2N), a vehicle that supports vehicle-to-infrastructure communication (V2I), an RSU equipped with a terminal function, an RSU equipped with a base station function, or an RSU equipped with a part of the base station function and a part of the terminal function. In the disclosure, downlink (DL) is a radio transmission path of a signal, which is transmitted by a base station to a terminal, and uplink (UL) denotes a radio transmission path of a signal, which is transmitted by a terminal to a base station. In addition, although embodiments will be described below using the NR system as an example, embodiments may be applied to other communication systems having similar technical backgrounds or channel types. In addition, the embodiments may be applied to other communication systems through some modifications within a range that does not significantly depart from the scope of the disclosure, as determined by a person skilled in the art.

In the disclosure, the terms of "physical channel" and "signal" can be used interchangeably with data or control signals. For example, a PDSCH is a physical channel through which data is transmitted, but in the disclosure, the PDSCH may be referred to as data.

Hereinafter, in the disclosure, higher signaling is a signal transmission method in which a signal is transmitted from a base station to a terminal using a downlink data channel of a physical layer, or a signal transmission method in which a signal is transmitted from a terminal to a base station using an uplink data channel of a physical layer, and the higher signaling may be referred to as RRC signaling or an MAC control element (CE).

The following embodiment provides a method and apparatus for performing transmission or reception of HARQ-ACK feedback for data transmission between a base station and a terminal or between terminals. The embodiment may be a case where the feedback is transmitted from one terminal to a plurality of terminals, or a case where the feedback is transmitted from one terminal to one terminal. Alternatively, the embodiment may be a case where the feedback is transmitted from a base station to a plurality of terminals. However, the disclosure may be applied to various cases without being limited thereto.

Figure 3B:
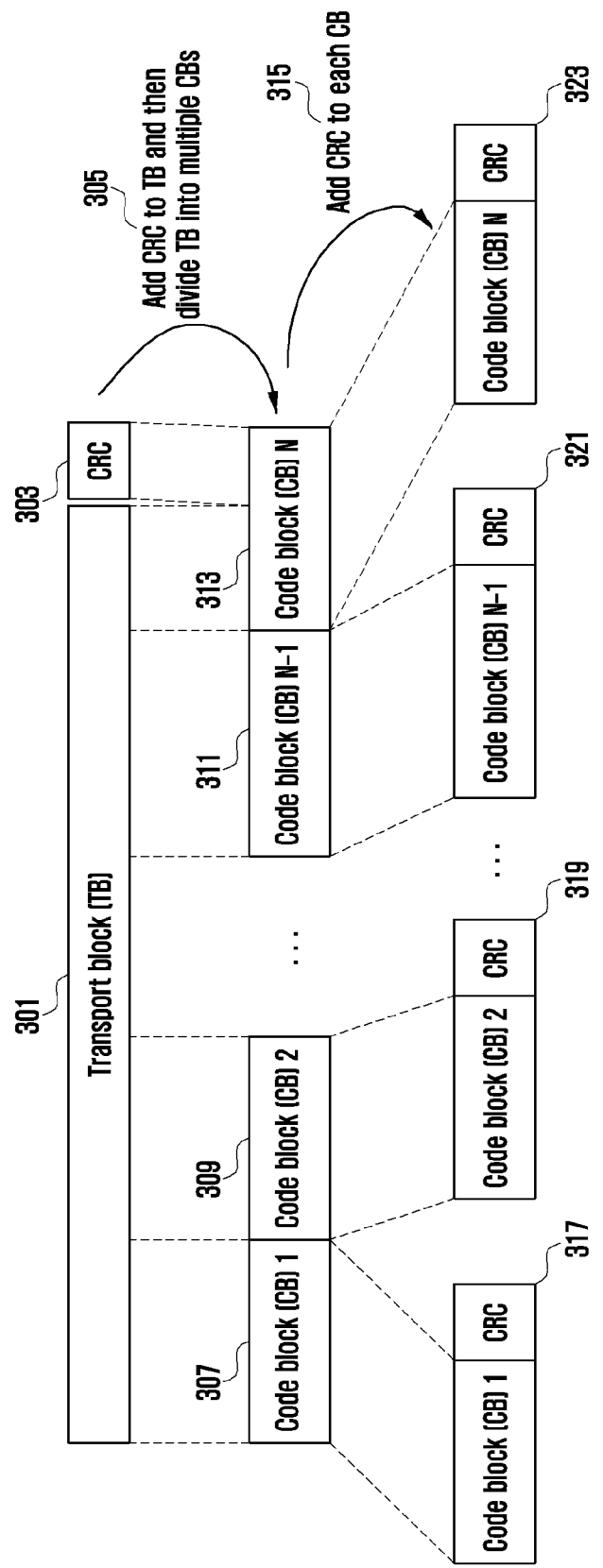
FIG. 3B illustrating a process in which one transport block is divided into a plurality of code blocks and a CRC is added thereto according to an embodiment.

FIG. 3B illustrates an embodiment in which one transport block is divided into a plurality of code blocks and a CRC is added thereto.

Referring to FIG. 3B, a CRC 303 may be added to the last part or the first part of one transport block (TB) 301 to be transmitted in an uplink or a downlink. The CRC 303 may have 16 bits, 24 bits, or a fixed number of bits, or may have a variable number of bits depending on channel conditions, and may be used to determine whether channel coding is successful. The TB 301 and a block to which CRC 303 is added may be divided into a plurality of code blocks (CBs) 307, 309, 311, and 313 (indicated by reference numeral 305). The divided code blocks may have a predetermined maximum size, and in this case, the last code block 313 may be smaller in size than those of other code blocks 307, 309, and 311. This is only given as an example, and according to another example, the last code block 313 may include a length adjusted to be the same as that of the other code blocks 307, 309, and 311 by adding zeros, random values, or ones into the last code block 313. CRCs 317, 319, 321, and 323 may be added to the code blocks 307, 309, 311, and 313, respectively (indicated by reference numeral 315). The CRC may include 16 bits, 24 bits, or a fixed number of bits, and may be used to determine whether channel coding is successful.

The TB 301 and cyclic generator polynomial may be used in order to generate the CRC 303, and the cyclic generator polynomial may be defined in various methods. For example, if it is assumed that cyclic generator polynomial $g_{CRC24A}(D)=[D^{24}+D^{23}+D^{18}+D^{17}+D^{14}+D^{11}+D^{10}+D^7+D^6+D^5+D^4+D^3+D_2+D^1]$ for a 24-bit CRC, and L=24, with respect to TB data $a_0, a_1, a_2, a_3, \ldots, a_{A-1}$, CRC $p_0, p_1, p_2, p_3, \ldots, P_{L-1}$, may be a value in which the remainder becomes zero by dividing $a_0 D^{A+23}+a_1 D^{A+22}+ \ldots a_{A-1}D^{24}+p_0 D^{23}+p_1 D^{22}+ \ldots +p_{22}D^1+p_{23}$ by $g_{CRC24A}(D)$, and may determine $p_0, p_1, p_2, p_3, \ldots, P_{L-1}$ In the above example, the CRC length "L" is assumed to be 24 as an example, but the CRC length "L" may be determined to have different lengths, such as 12, 16, 24, 32, 40, 48, 64, and the like.

Through this process, the CRC is added to the TB, and the TB having CRC added thereto may be divided into N CBs 307, 309, 311, and 313. CRCs 317, 319, 321, and 423 may be added to each of the divided CBs 307, 309, 311, 313 (indicated by reference numeral 315). The CRC added to the CB may have a different length than the CRC added to the TB or may use a different cyclic generator polynomial. In addition, the CRC 303 added to the TB and the CRCs 317, 319, 321, and 323 added to the code block may be omitted depending on the type of a channel code to be applied to the code block. For example, if LDPC codes other than turbo codes are applied to code blocks, CRCs 317, 319, 321, and 323 to be inserted for each code block may be omitted.

However, even if the LDPC is applied, the CRCs 317, 319, 321, and 323 may be added to the code block as it is. In addition, CRC may be added or omitted even if a polar code is used.

As described above in FIG. 3B, the maximum length of one code block is determined according to the type of channel coding applied to a TB to be transmitted, and the TB and CRC, which is added to the TB, are divided into code blocks according to the maximum length of the code block.

In the conventional LTE system, CRC for CB is added to the divided CB, data bits and the CRC of the CB are encoded with a channel code, and thus coded bits are determined and a number of bits, which perform predetermined rate matching to each of coded bits, may be determined.

The size of TB in the NR system may be calculated through the following operations.

Operation 1: Calculate $N'_{RE}$, the number of REs assigned to PDSCH mapping in one PRB in the allocated resource. Here, $N'_{RE}$ may be calculated by $N_{sc}^{RB} \cdot N_{symb}^{sh} - N_{DMRS}^{PRB} - N_{oh}^{PRB}$. Here, $N_{sc}^{RB}$ is 12, and $N_{symb}^{sh}$ may represent the number of OFDM symbols allocated to the PDSCH. $N_{DMRS}^{PRB}$ is the number of REs in one PRB occupied by DMRSs of the same code division multiplexing (CDM) group. $N_{oh}^{RB}$ is the number of REs occupied by the overhead in one PRB, which is configured via higher signaling, and may be configured to 0, 6, 12, or 18. Thereafter, $N_{RE}$, the total number of REs, allocated to the PDSCH may be calculated. $N_{RE}$ is calculated by $\min(156, N'_{RE}) \cdot n_{PRB}$, and $n_{PRB}$ denotes the number of PRBs allocated to the terminal.

Operation 2: The number of temporary information bits, $N_{info}$, may be calculated by $N_{RE}*R*Q_m*v$. Here, R is a code rate, Qm is a modulation order, and information of the value may be transferred using MCS bitfield and a table predefined in the control information. Also, v is the number of assigned layers. If $N_{info} \leq 3824$, TBS may be calculated through operation 3 as follows. Otherwise, TBS may be calculated through operation 4.

Operation 3: $N'_{info}$ may be calculated by the equation of $$N'_{info} = \max\left(24, 2^n * \left\lfloor \frac{N_{info}}{2^n} \right\rfloor\right)$$

and n=max (3, $[\log_2(N_{info})]-6$). TBS may be determined as a value, which is closest to $N'_{info}$ among values equal to or larger than $N'_{info}$ in <Table 4a> below.

TABLE 4a

| Index | TBS |
|---|---|
| 1 | 24 |
| 2 | 32 |
| 3 | 40 |
| 4 | 48 |
| 5 | 56 |
| 6 | 64 |
| 7 | 72 |
| 8 | 80 |
| 9 | 88 |
| 10 | 96 |
| 11 | 104 |
| 12 | 112 |
| 13 | 120 |
| 14 | 128 |
| 15 | 136 |
| 16 | 144 |
| 17 | 152 |
| 18 | 160 |
| 19 | 168 |
| 20 | 176 |
| 21 | 184 |
| 22 | 192 |
| 23 | 208 |
| 24 | 224 |
| 25 | 240 |
| 26 | 256 |
| 27 | 272 |
| 28 | 288 |
| 29 | 304 |
| 30 | 320 |
| 31 | 336 |
| 32 | 352 |
| 33 | 368 |
| 34 | 384 |
| 35 | 408 |
| 36 | 432 |
| 37 | 456 |
| 38 | 480 |
| 39 | 504 |
| 40 | 528 |
| 41 | 552 |
| 42 | 576 |
| 43 | 608 |
| 44 | 640 |
| 45 | 672 |
| 46 | 704 |
| 47 | 736 |
| 48 | 768 |
| 49 | 808 |
| 50 | 848 |
| 51 | 888 |
| 52 | 928 |
| 53 | 984 |
| 54 | 1032 |
| 55 | 1064 |
| 56 | 1128 |
| 57 | 1160 |
| 58 | 1192 |
| 59 | 1224 |
| 60 | 1256 |
| 61 | 1288 |
| 62 | 1320 |
| 63 | 1352 |
| 64 | 1416 |
| 65 | 1480 |
| 66 | 1544 |
| 67 | 1608 |
| 68 | 1672 |
| 69 | 1736 |
| 70 | 1800 |
| 71 | 1864 |
| 72 | 1928 |
| 73 | 2024 |
| 74 | 2088 |
| 75 | 2152 |
| 76 | 2216 |
| 77 | 2280 |
| 78 | 2408 |
| 79 | 2472 |
| 80 | 2536 |
| 81 | 2600 |
| 82 | 2664 |
| 83 | 2728 |
| 84 | 2792 |
| 85 | 2856 |
| 86 | 2976 |
| 87 | 3104 |
| 88 | 3240 |
| 89 | 3368 |
| 90 | 3496 |
| 91 | 3624 |
| 92 | 3752 |
| 93 | 3824 |

Operation 4: $N'_{info}$ may be calculated by the equation of $$N'_{info} = \max\left(3840, 2^n \times \text{round}\left(\frac{N_{info} - 24}{2^n}\right)\right)$$

and n=$[\log_2(N_{info}-24)]-5$. TBS can be determined through a value of $N^1_{info}$ and the following [pseudo-code 1]. Here, 'C' denotes the number of code blocks.

[Start of Pseudo-code 1]
if R ≤ 1/4

$$TBS = 8 * C * \left\lceil \frac{N^1_{info} + 24}{8 * C} \right\rceil - 24, \text{ where } C = \left\lceil \frac{N^1_{info} + 24}{3816} \right\rceil$$

else
  if $N_{info}' > 8424$ $$TBS = 8 * C * \left\lceil \frac{N^1_{info} + 24}{8 * C} \right\rceil - 24, \text{ where } C = \left\lceil \frac{N^1_{info} + 24}{8424} \right\rceil$$

else $$TBS = 8 * \left\lceil \frac{N^1_{info} + 24}{8} \right\rceil - 24$$

end if
end if
[End of Pseudo-code 1]

In the NR system, if one CB is input to an LDPC encoder, parity bits may be added to the CB and the CB added with the parity bits may be output. The amount of parity bits may differ according to an LDPC base graph. A method for transmitting all parity bits, generated by LDPC coding for a specific input, may be called full buffer rate matching (FBRM), and a method for limiting the number of parity bits that can be transmitted may be called limited buffer rate matching (LBRM). If resources are allocated for data transmission, the output of the LDPC encoder is made into a circular buffer, and bits of the buffer are repeatedly transmitted as many times as the allocated resources, and the length of the circular buffer may be called Ncb. If the number of bits of all LDPC codewords, generated by LDPC coding is N, Ncb is equal to N in the FBRM method. In the LBRM method, $N_{cb}$ denotes $\min(N_l, N_{ref})$, $N_{ref}$ is given by $$\left\lfloor \frac{TBS_{LBRM}}{C \cdot R_{LBRM}} \right\rfloor,$$

and $R_{LBRM}$ may be determined to be 2/3. In a method for obtaining the TBS described above, $TBS_{LBRM}$ denotes the maximum number of layers supported by a terminal in the corresponding cell, which corresponds to the maximum modulation order configured for the terminal in the cell. Further, if there is no configured maximum modulation order, $TBS_{LBRM}$ is assumed to be 64QAM, and the code rate is assumed to be 948/1024, which is the maximum code rate. $N_{RE}$ is assumed to be $156*n_{prb}$, and $n_{prb}$ may be assumed to be $n_{PRB,LBRM}$, wherein $n_{PRB,LBRM}$ may be given as shown in <Table 4b> below.

TABLE 4b

| Maximum number of PRBs across all configured BWPs of a carrier | $n_{PRB,LBRM}$ |
|---|---|
| Less than 33 | 32 |
| 33 to 66 | 66 |
| 67 to 107 | 107 |
| 108 to 135 | 135 |
| 136 to 162 | 162 |
| 163 to 217 | 217 |
| Larger than 217 | 273 |

In <Equation 1>, J may denote the number of carriers bound by carrier aggregation, $R_{max}=948/1024$, $v_{Layers}^{(j)}$ may denote the maximum number of layers, $Q_m^{(j)}$ may denote a maximum modulation order, $f^{(j)}$ may denote a scaling index, and μ may denote a subcarrier spacing. The terminal may report one of 1, 0.8, 0.75, and 0.4 values of $f^{(j)}$, and μ may be given as shown in <Table 4c> below.

TABLE 4c

| μ | $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Further, $T_s^\mu$ is the average OFDM symbol length, $T_s^\mu$ may be calculated to be $$\frac{10^{-3}}{14 \cdot 2^\mu},$$

and $N_{PBR}^{BW(j),\mu}$ is the maximum number of RBs in BW(j). $OH^{(j)}$ is an overhead value, and $OH^{(j)}$ may be given as 0.14 in the downlink and given as 0.18 in the uplink of FR1 (a band equal to or less than 6 GHz), and may be given as 0.08 in the downlink and given as 0.10 in the uplink of FR2 (a band exceeding 6 GHz). Through <Equation 1>, the maximum data rate in the downlink in a cell having a 100 MHz frequency bandwidth at a 30 kHz subcarrier spacing may be calculated by the following <Table 4d>.

TABLE 4d

| $f^{(j)}$ | $v_{Layers}^{(j)}$ | $Q_m^{(j)}$ | Rmax | $N_{PRB}^{BW(j),\mu}$ | $T_s^\mu$ | $OH^{(j)}$ | data rate |
|---|---|---|---|---|---|---|---|
| 1 | 4 | 8 | 0.92578125 | 273 | 3.57143E−05 | 0.14 | 2337.0 |
| 0.8 | 4 | 8 | 0.92578125 | 273 | 3.57143E−05 | 0.14 | 1869.6 |
| 0.75 | 4 | 8 | 0.92578125 | 273 | 3.57143E−05 | 0.14 | 1752.8 |
| 0.4 | 4 | 8 | 0.92578125 | 273 | 3.57143E−05 | 0.14 | 934.8 |

The maximum data rate supported by a terminal in the NR system may be determined through <Equation 1> below.

[Equation 1]

$$\text{data rate (in } Mbps\text{)} = 10^{-6} \cdot \sum_{j=1}^{J} \left( v_{Layers}^{(j)} \cdot Q_m^{(j)} \cdot f^{(j)} \cdot R_{max} \cdot \frac{N_{PRB}^{BW(j),\mu} \cdot 12}{T_s^\mu} \cdot \left(1 - OH^{(j)}\right) \right)$$

On the other hand, an actual data rate that the terminal can measure in the actual data transmission may be a value obtained by dividing the data amount by a data transmission time. This may be a value obtained by dividing TBS by the TTI length in 1 TB transmission or dividing the sum of TBSs by the TTI length in 2 TB transmission. For example, as shown in <Table 4d>, the maximum actual data rate in downlink in a cell having a 100 MHz frequency bandwidth at a 30 kHz subcarrier spacing may be determined as shown in <Table 4e> below according to the number of allocated PDSCH symbols.

TABLE 4e

| $N_{symb}^{sh}$ | $N_{DMRS}^{PRB}$ | $N^1_{RE}$ | $N_{RE}$ | $N_{info}$ | n | $N^1_{info}$ | C | TBS | TTI length (ms) | data rate (Mbps) |
|---|---|---|---|---|---|---|---|---|---|---|
| 3 | 8 | 28 | 7644 | 226453.5 | 12 | 225,280 | 27 | 225,480 | 0.107143 | 2,104.48 |
| 4 | 8 | 40 | 10920 | 323505.0 | 13 | 319,488 | 38 | 319,784 | 0.142857 | 2,238.49 |
| 5 | 8 | 52 | 14196 | 420556.5 | 13 | 417,792 | 50 | 417,976 | 0.178571 | 2,340.67 |
| 6 | 8 | 64 | 17472 | 517608.0 | 13 | 516,096 | 62 | 516,312 | 0.214286 | 2,409.46 |
| 7 | 8 | 76 | 20748 | 614659.5 | 14 | 622,592 | 74 | 622,760 | 0.250000 | 2,491.04 |
| 8 | 8 | 88 | 24024 | 711711.0 | 14 | 704,512 | 84 | 704,904 | 0.285714 | 2,467.16 |
| 9 | 8 | 100 | 27300 | 808762.5 | 14 | 802,816 | 96 | 803,304 | 0.321429 | 2,499.17 |
| 10 | 8 | 112 | 30576 | 905814.0 | 14 | 901,120 | 107 | 901,344 | 0.357143 | 2,523.76 |
| 11 | 8 | 124 | 33852 | 1002865.5 | 14 | 999,424 | 119 | 999,576 | 0.392857 | 2,544.38 |
| 12 | 8 | 136 | 37128 | 1099917.0 | 15 | 1,114,112 | 133 | 1,115,048 | 0.428571 | 2,601.78 |
| 13 | 8 | 148 | 40404 | 1196968.5 | 15 | 1,212,416 | 144 | 1,213,032 | 0.464286 | 2,612.68 |
| 14 | 8 | 160 | 43680 | 1294020.0 | 15 | 1,277,952 | 152 | 1,277,992 | 0.500000 | 2,555.98 |

The maximum data rate supported by the terminal may be identified through <Table 4d>, and the actual data rate according to the allocated TBS may be identified through <Table 4e>. At this time, the actual data rate may be larger than the maximum data rate depending on scheduling information.

In a wireless communication system, in particular, a new radio (NR) system, data rates that a terminal can support may be promised between a base station and a terminal. The data rate may be calculated using the maximum frequency band, the maximum modulation order, the maximum number of layers, which are supported by the terminal. However, the calculated data rate may be different from a value calculated according to a transport block size (TBS) and a transmission time interval (TTI) length of a transport block (TB) used for actual data transmission.

Accordingly, a case, in which a terminal is allocated with a TBS larger than a value corresponding to a data rate supported by the terminal itself, may occur. In order to prevent the case from occurring, there may be a limitation of the TBS that can be scheduled according to a data rate supported by the terminal.

Figure 4:
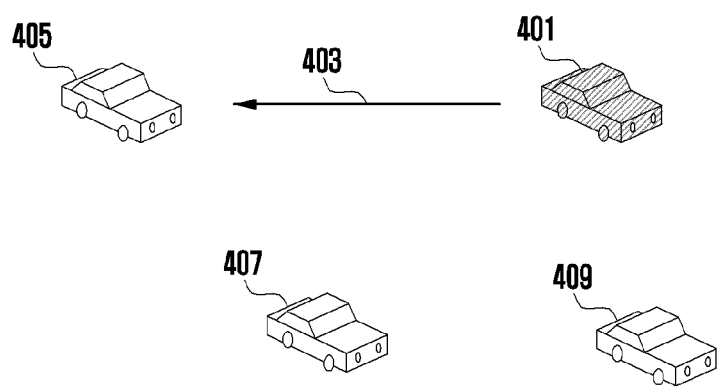
FIG. 4 illustrates an example in which one-to-one communication between two terminals 401 and 405, that is, unicast communication is performed through a sidelink.

FIG. 4 illustrates an example in which one-to-one communication between two terminals 401 and 405, that is, unicast communication is performed through a sidelink.

FIG. 4 illustrates an example in which a signal is transmitted from a first terminal 401 to a second terminal 405, and the direction of signal transmission may be reversed. That is, a signal may be transmitted from the second terminal 405 to the first terminal 401. The terminals 407 and 409 other than the first terminal 401 and the second terminal 405 may not receive signals exchanged through unicast communication between the first terminal 401 and the second terminal 405. The exchange of signals through the unicast communication between the first terminal 401 and the second terminal 405 may be performed through mapping in a promised resource between the first terminal 401 and the second terminal 405, or may be performed through a process of scrambling using a value promised therebetween, mapping of control information, data transmission using mutually configured values, and identifying unique ID values with each other. The terminal may be a mobile terminal such as a vehicle. For the unicast communication, separate control information, physical control channels, and data may be transmitted.

Figure 5:
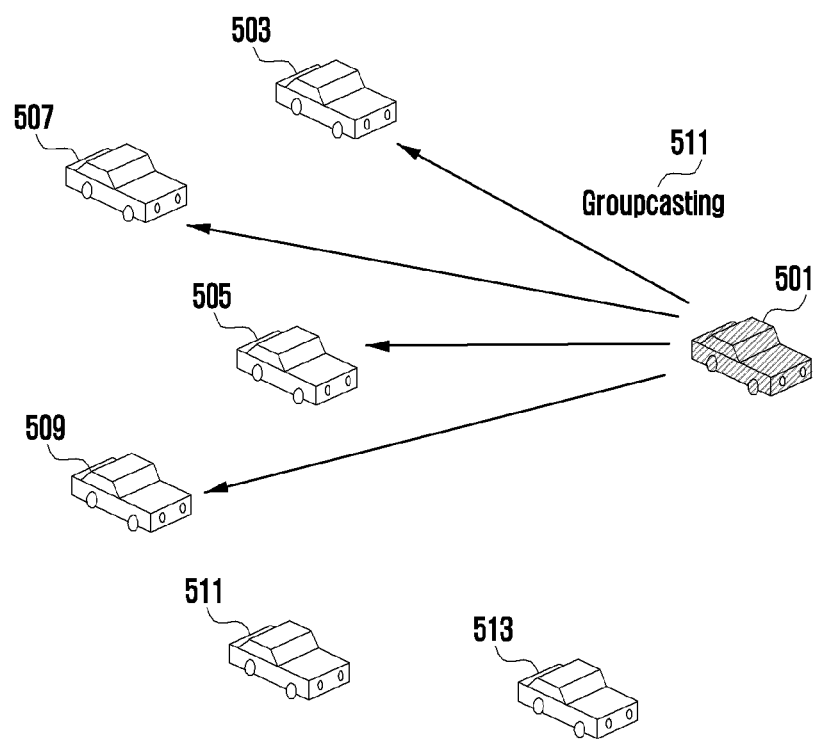
FIG. 5 illustrates an example of groupcast communication in which one terminal transmits common data to a plurality of terminals through a sidelink.

FIG. 5 illustrates an example of groupcast communication 511 in which one terminal 501 transmits common data to a plurality of terminals 503, 505, 507, and 509 through a sidelink.

In FIG. 5, an example, in which a first terminal 501 transmits a signal to other terminals 503, 505, 507, and 509 in a group, is illustrated and other terminals 511 and 513 that are not included in the group may not receive signals transmitted for groupcast communication.

A terminal for transmitting a signal for the groupcast communication may correspond to another terminal in the group, and resource allocation for signal transmission may be provided by a base station or a terminal serving as a leader in the group, or may be selected by the terminal itself which has transmitted the signal. The terminal may be a mobile terminal such as a vehicle. Separate control information, physical control channels, and data may be transmitted for the groupcasting.

Figure 6:
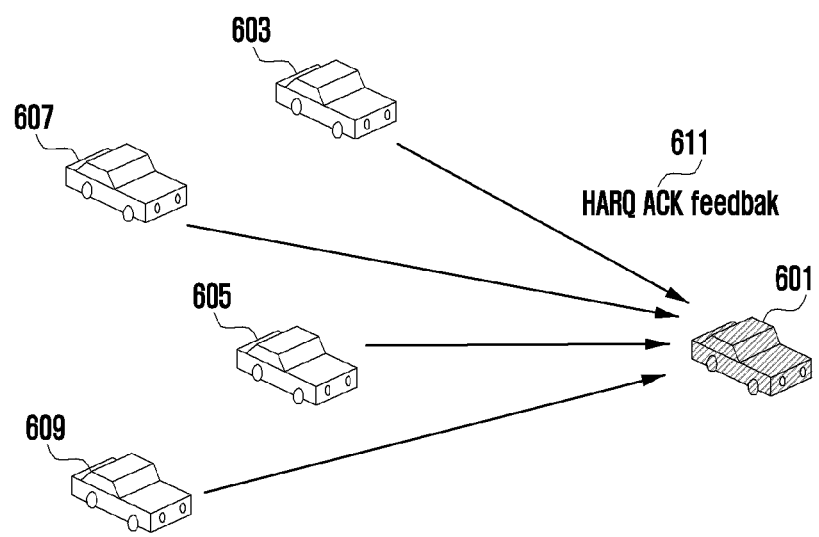
FIG. 6 illustrates a process in which terminals, which have received common data through groupcasting, transmit information relating to success or failure of reception of the data to a terminal that has transmitted data.

FIG. 6 illustrates a process in which terminals 603, 605, 607, and 609, which have received common data through groupcasting, transmit information relating to success or failure of reception of data to a terminal 601, which has transmitted data.

The information may be information such as HARQ-ACK feedback 611. The terminals may be terminals having an LTE-based sidelink function or an NR-based sidelink function. If a terminal has only an LTE-based sidelink function, it may be impossible for the terminal to transmit or receive an NR-based sidelink signal and an NR-based physical channel. In the disclosure, the sidelink may be interchangeably used with PC5, V2X, or D2D. FIGS. 5 and 6 illustrate an example of transmission or reception according to groupcasting, but the descriptions may also be applied to a unicast signal transmission or reception between terminals.

Figure 7:
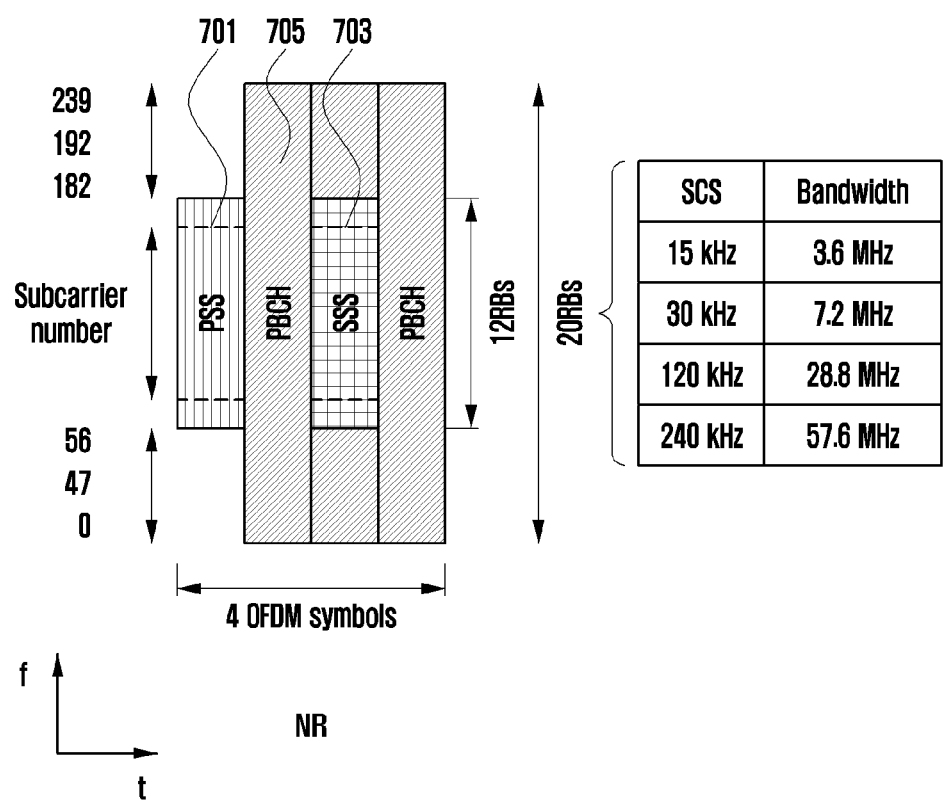
FIG. 7 illustrates an aspect in which a synchronization signal and a physical broadcast channel of an NR system are mapped in a frequency and a time domain.

FIG. 7 illustrates an aspect in which a synchronization signal and a physical broadcast channel (PBCH) of an NR system are mapped in a frequency and a time domain.

A primary synchronization signal (PSS) 701, a secondary synchronization signal (SSS) 703, and the PBCH are mapped over 4 OFDM symbols, the PSS and the SSS are mapped to 12 RBs, and the PBCH is mapped to 20 RBs. The table in FIG. 7 shows that frequency bands of 20 RBs change according to a subcarrier spacing (SCS). A resource domain in which the PSS, the SSS, and the PBCH are transmitted may be called a SS/PBCH block. In addition, the SS/PBCH block may be referred to as an SSB block.

Figure 8:
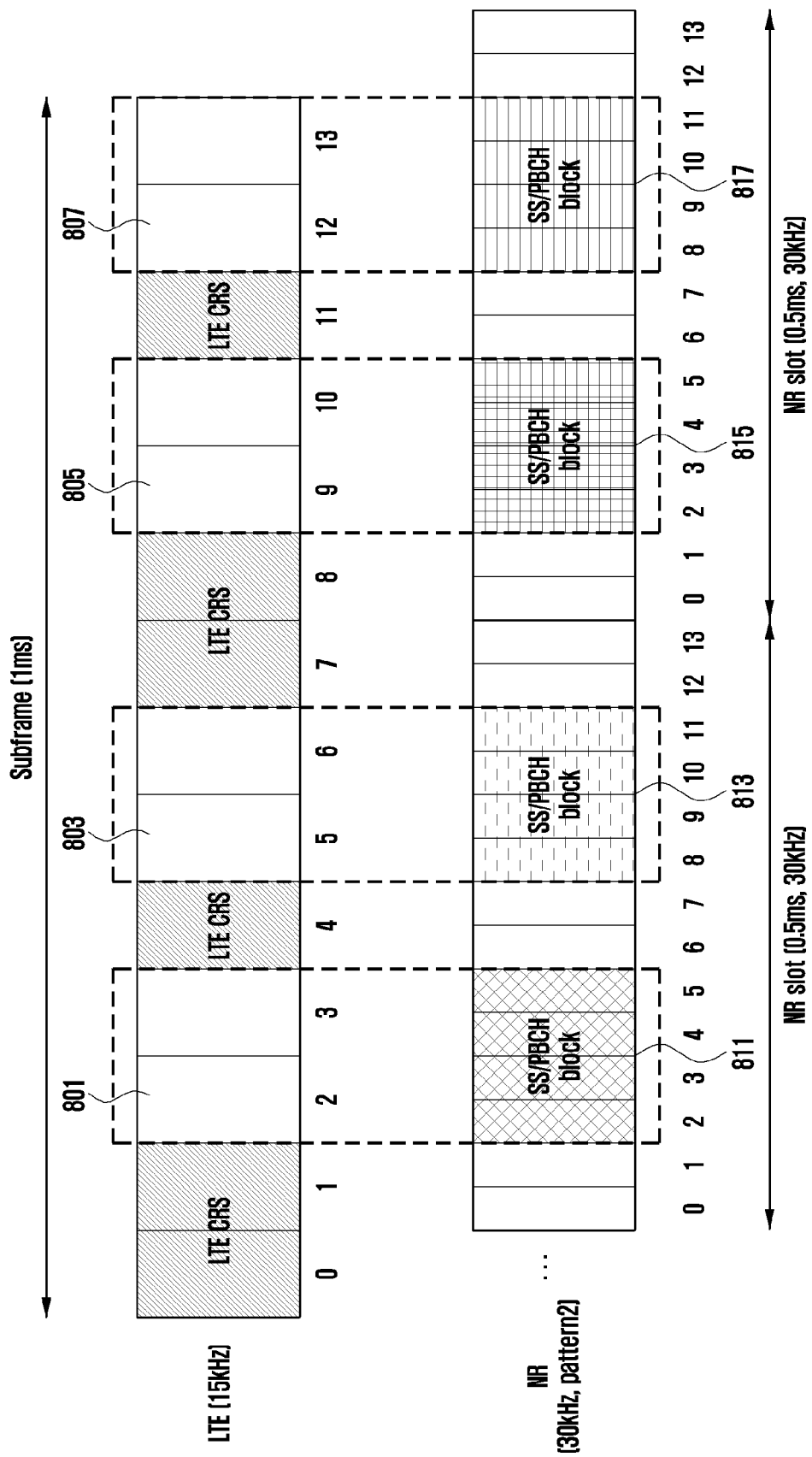
FIG. 8 illustrates symbols in a slot to which a single SS/PBCH block is mapped.

FIG. 8 illustrates symbols, in a slot, to which a single SS/PBCH block is mapped.

Referring to FIG. 8, an example of a conventional LTE system using subcarrier spacing of 15 kHz and an NR system using subcarrier spacing of 30 kHz, and SS/PBCH blocks 811, 813, 815, and 817 of the NR system are designed to be transmitted at positions 801, 803, 805, and 807 at which cell-specific reference signals (CRS) always transmitted in the LTE system can be avoided. The purpose of the design may be in order to allow an LTE system and an NR system to coexist in a single frequency band.

Figure 9:
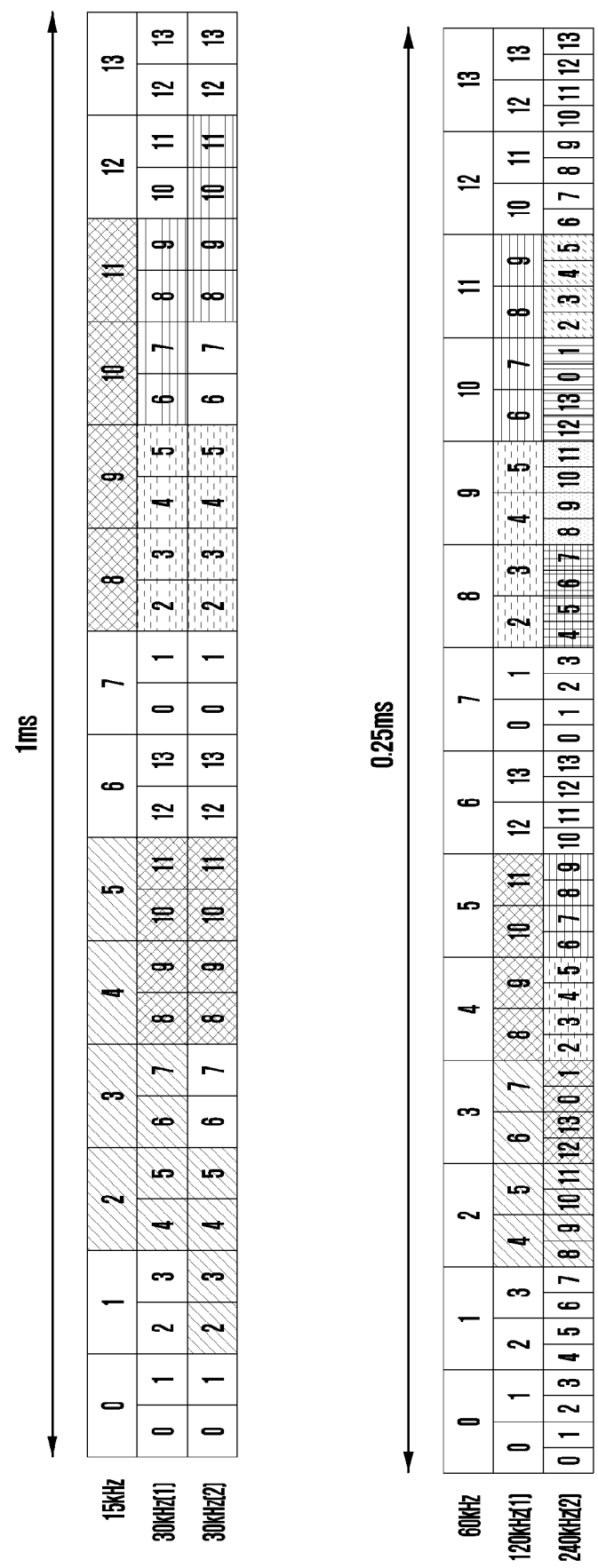
FIG. 9 illustrates a symbol through which an SS/PBCH block may be transmitted according to a subcarrier spacing.

FIG. 9 illustrates symbols to which an SS/PBCH block can be transmitted, based on a subcarrier spacing.

Referring to FIG. 9, the subcarrier spacing may be configured as 15 kHz, 30 kHz, 120 kHz, 240 kHz, and the like, and the position of a symbol, in which the SS/PBCH block (or SSB block) may be positioned, may be determined according to each subcarrier spacing. FIG. 9 shows the position of a symbol through which an SSB block can be transmitted according to a subcarrier spacing in symbols within 1 ms, and the SSB block in the region shown in FIG. 9 is not always required to be transmitted. Accordingly, the position where the SSB block is transmitted may be configured for the terminal through system information or dedicated signaling.

Figure 10:
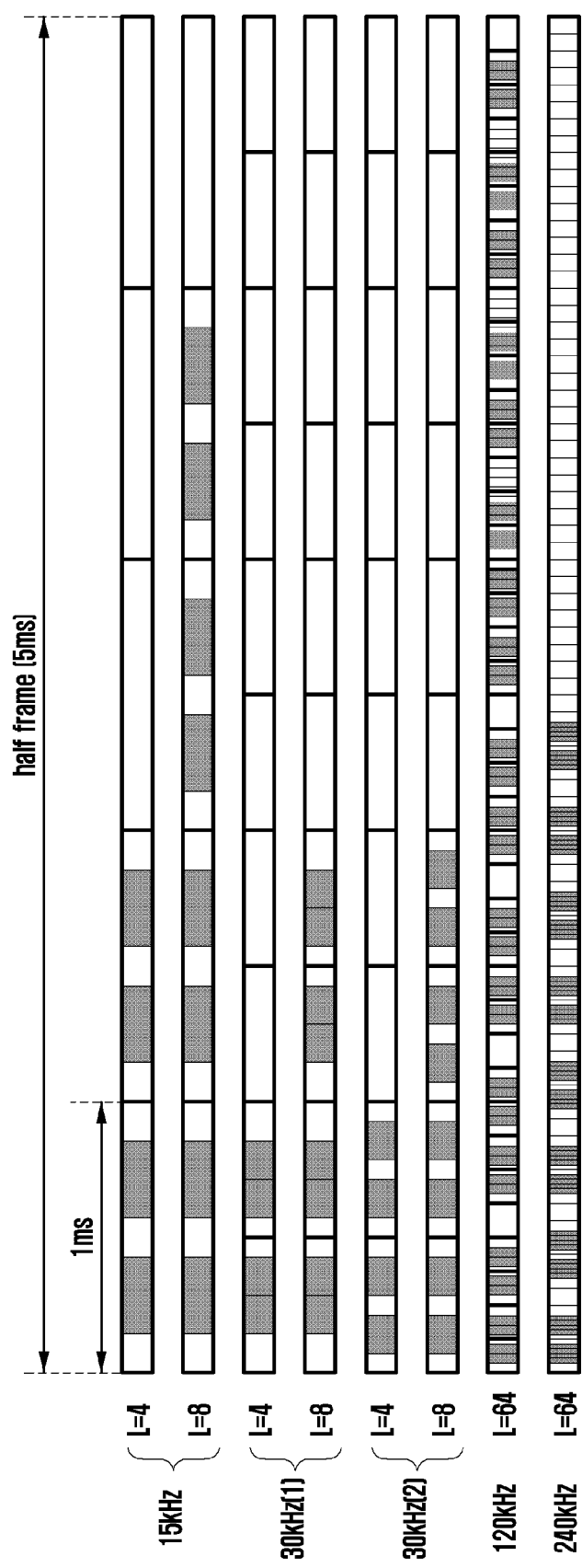
FIG. 10 is another diagram illustrating a symbol through which an SS/PBCH block may be transmitted according to a subcarrier spacing.

FIG. 10 illustrates symbols to which an SS/PBCH block can be transmitted according to a subcarrier spacing.

Referring to FIG. 10, the subcarrier spacing may be configured as 15 kHz, 30 kHz, 120 kHz, 240 kHz, and the like, and the position of a symbol, in which the SS/PBCH block (or SSB block) may be positioned, may be determined according to each subcarrier spacing. FIG. 10 shows the position of a symbol through which an SSB block can be transmitted according to a subcarrier spacing in symbols within 5 ms, and the position where the SSB block is transmitted may be configured for a terminal through system information or dedicated signaling. In a region where the SS/PBCH block can be transmitted, the SS/PBCH block is not always required to be transmitted, and may or may not be transmitted depending on the selection of the base station. Accordingly, the position where the SSB block is transmitted may be configured for a terminal through system information or dedicated signaling.

In the disclosure, a sidelink control channel may be called a physical sidelink control channel (PSCCH), and a sidelink shared channel or a sidelink data channel may be called a physical sidelink shared channel (PSSCH). A broadcast channel which is broadcasted together with a synchronization signal may be called a physical sidelink broadcast channel (PSBCH), and a channel for feedback transmission may be called a physical sidelink feedback channel (PSFCH). In order to perform feedback transmission, a PSCCH or a PSSCH may be used. The channels may be referred to as an LTE-PSCCH, an LTE-PSSCH, an NR-PSCCH, an NR-PSSCH, etc. according to communication systems in which the channels are transmitted. In the disclosure, a sidelink may indicate a link between terminals, and a Uu link may indicate a link between a base station and a terminal.

Figure 11:
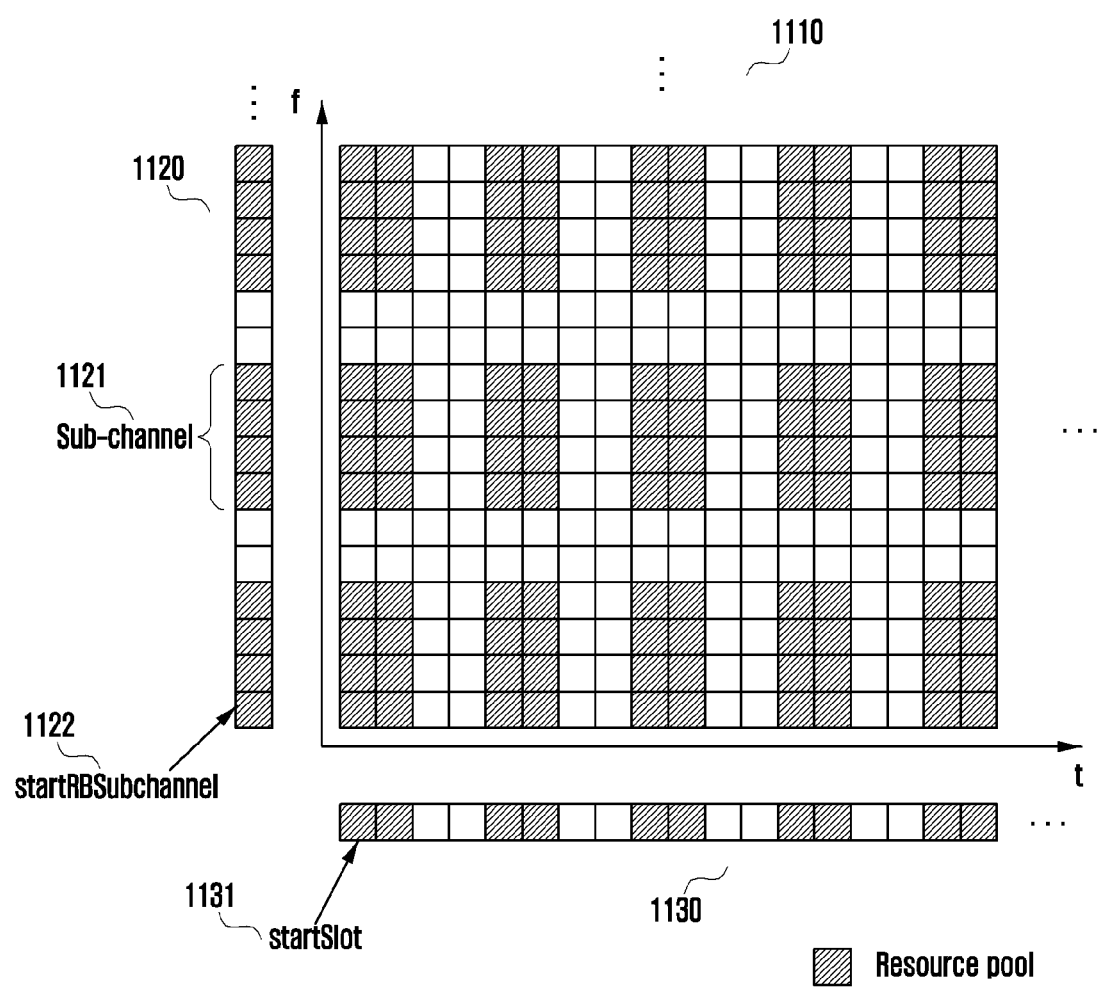
FIG. 11 illustrates an example of a resource pool, which is defined as a set of resource resources in a time and a frequency domain, used for transmission or reception through a sidelink.

FIG. 11 illustrates an example of a resource pool, defined as a set of resources in a time and a frequency domain used for transmission or reception through a sidelink.

Reference numeral 1110 is an example of illustrating a case where a resource pool is non-contiguously allocated in a time and a frequency domain. In the disclosure, a case in which the resource pool is non-contiguously allocated in the frequency domain is mainly discussed. However, it is noted that the resource pool may be contiguously allocated in the frequency domain.

Reference numeral 1120 is an example of illustrating a case in which non-contiguous resource allocation is performed in a frequency domain. A unit (granularity) of resource allocation in the frequency domain may be a physical resource block (PRB).

Reference numeral 1121 is an example of illustrating a case in which resource allocation in a frequency domain is made based on a sub-channel. A sub-channel may be defined by a unit of frequency, including multiple RBs. In other words, the sub-channel may be defined as an integer multiple of RB. Reference numeral 1121 of FIG. 11 shows a case in which the size of a sub-channel is configured by four consecutive PRBs. Sub-channels may be configured to have different sizes, and a single sub-channel is generally configured by consecutive PRBs, but don't need to be configured by consecutive PRBs necessarily. A sub-channel may be a basic unit for resource allocation for a physical sidelink shared channel (PSSCll) or a physical sidelink control channel (PSCCH). Therefore, the size of a sub-channel may be differently configured according to whether a corresponding channel is a PSSCH or a PSCCH. It is noted that a sub-channel, as a term, may be replaced with a resource block group (RBG). The following embodiments describe methods for non-contiguously allocating resource pools in a frequency domain and classifying the resource pools into a plurality of sub-channels.

A startRBSubchannel, indicated by reference numeral 1122, indicates a start position of a sub-channel in a frequency domain in a resource pool.

A resource block, which is a frequency resource belonging to a resource pool for a PSSCH in an LTE V2X system, may be determined by the following method:

The resource block pool consists of $N_{subCH}$ sub-channels where $N_{subCH}$ is given by higher layer parameter numSubchannel.

The sub-channel m for m=0, 1, ... $N_{subCH}-1$ consists of a set of contiguous resource blocks with the physical resource block number $n_{PRB}=n_{subCHRBstart}+m*n_{subCHsize}+j$ for j=0, 1, ... $n_{subCHsize}-1$ where $n_{subCHRBstart}$ and $n_{subCHsize}$ are given by higher layer parameters startRBSubchannel and sizeSubchannel, respectively.

Reference numeral 1130 illustrates an example of a case in which non-contiguous resource allocation is performed in a time domain. A unit (granularity) of resource allocation in the time domain may be a slot. In the disclosure, a case in which a resource pool is non-contiguously allocated in the time domain is mainly discussed. However, it is noted that a resource pool may be contiguously allocated in the time domain.

A startSlot, indicated by reference numeral 1131, indicates a start position of a slot in the time domain in a resource pool.

Subframes ($t_0^{SL}, t_1^{SL}, \ldots t_{T_{max}}^{SL}$), which are time resources belonging to a resource pool for a PSSCH in an LTE V2X system, may be determined by the following method.

$0 \leq t_i^{sL} < 10240$,

The subframe index is relative to subframe #0 of the radio frame corresponding to SFN 0 of the serving cell or DFN 0 (described in [11]), The set includes all the subframes except the following subframes, Subframes in which an SLSS resource is configured, Downlink subframes and special subframes if the sidelink transmission occurs in a TDD cell, Reserved subframes which are determined by the following steps:

1) the remaining subframes excluding $N_{slss}$ and $N_{dssf}$ subframes from the set of all the subframes are denoted by $l_0, l_1, \ldots l_{(10240-N_{slss}-N_{dssf}-1)}$) arranged in increasing order of subframe index, where $N_{slss}$ is the number of subframes in which SLSS resource is configured within 10240 subframes and $N_{dssf}$ is the number of downlink subframes and special subframes within 10240 subframes if the sidelink transmission occurs in a TDD cell.

2) A subframe $1_r (0 \leq r < (10240 - N_{slss} - N_{dssf}))$ belongs to the reserved subframes if $$r = \left\lfloor \frac{m \cdot (10240 - N_{slss} - N_{dssf})}{N_{reserved}} \right\rfloor$$

where $m=0, \ldots, N_{reserved}-1$ and $N_{reserved}=(10240-N_{slss}-N_{dssf}) \bmod L_{bitmap}$. Here, $L_{bitmap}$ is the length of the bitmap and is configured by higher layers.

The subframes are arranged in increasing order of subframe index.

A bitmap $(b_0, b_1, \ldots, b_{L_{bitmap}-1})$ associated with the resource pool is used where $L_{bitmap}$ is the length of the bitmap and is configured by higher layers.

A subframe $t_k^{sL}$ $(0 \leq k < (10240 - N_{slss} - N_{dssf} - N_{reserved}))$ belongs to the subframe pool if $b_{k'}=1$ where $k'=k \bmod L_{bitmap}$.

Figure 12:
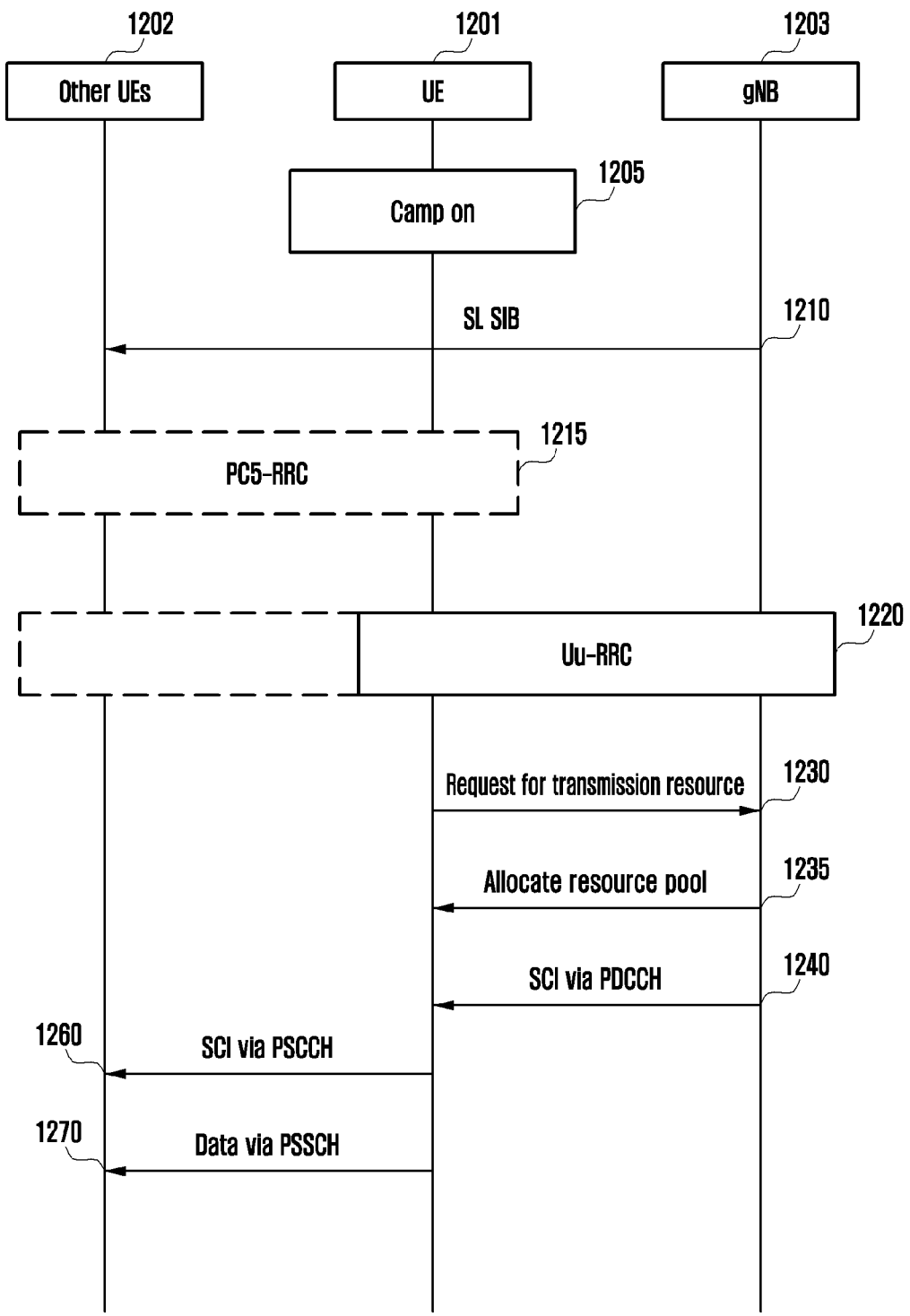
FIG. 12 illustrates an example of a method for scheduled resource allocation (mode 1) through a sidelink.

FIG. 12 illustrates an example of a method for scheduled resource allocation (mode 1) through a sidelink. Scheduled resource allocation (mode 1) is a method in which a base station allocates resources, used for sidelink transmission, to RRC-connected UEs in a dedicated scheduling manner. The scheduled resource allocation method may be effective for interference management and resource pool management because the base station may manage resources of a sidelink.

In FIG. 12, a UE 1201, which is camping on in operation 1205, receives a sidelink system information bit (SL SIB) from a base station 1203 in operation 1210. The system information may include resource pool information for transmission or reception, configuration information for sensing operation, information for configuring synchronization, information for inter-frequency transmission or reception, and the like. If data traffic for V2X is generated in the UE 1201, an RRC connection with the base station 1203 is established in operation 1220. Here, the RRC connection between the UE and the base station may be referred to as Uu-RRC. A process of the Uu-RRC connection may be performed before the data traffic is generated. The UE 1201 requests a transmission resource capable of V2X communication with other UEs 1202 from the base station 1203 in operation 1230. At this time, the UE 1201 may request a transmission resource from the base station by using an RRC message or MAC CE. Here, as the RRC message, a SidelinkUEInformation, UEAssistanceInformation message may be used. Meanwhile, the MAC CE may be, for example, a buffer status report MAC CE having a new format (including at least an indicator notifying of a buffer status report for V2X communication and information on a size of data that are buffered for D2D communication). Detailed format and contents of the buffer status report used in 3GPP can be understood by referring to 3GPP standard TS36.321 "E-UTRA MAC Protocol Specification". The base station 1203 allocates a V2X transmission resource to the UE 1201 through a dedicated Uu-RRC message. The message may be included in an RRCConnectionReconfiguration message. The resource allocation may be performed using a V2X resource through Uu or a resource for PC5 according to the type of traffic requested by the UE 1201 or according to whether the corresponding link is congested. In order to determine the resource, the UE 1201 may add logical channel ID (LCID) information or prose per packet priority (PPPP) of V2X traffic to UEAssistanceInformation or MAC CE and transmit the same. Since the base station 1203 also knows information about resources used by other UEs 1202, the base station may allocate a remaining resource pool among the resources requested by the UE 1201 in operation 1235. The base station 1203 may instruct the UE 1201 to perform final scheduling via DCI transmission through the PDCCH in operation 1240.

Next, in the case of broadcast transmission, the UE 1201 broadcasts sidelink control information (SCI) to other UEs 1202 via the PSCCH using broadcast transmission without an additional RRC configuration of the sidelink in operation 1260. In addition, the UE 1201 broadcasts data to other UEs 1220 through the PSSCH in operation 1270.

Alternatively, in the case of unicast and groupcast transmission, the UE 1201 may establish an RRC connection with other UEs on a one-to-one basis. Here, in order to differentiate from the Uu-RRC, the RRC connection between a UE and a UE may be referred to as PC5-RRC. Even in the case of groupcast communication, PC5-RRCs are individually connected between UEs belonging to a group. In FIG. 12, PC5-RRC connection 1215 is illustrated as being performed after operation 1210, but the PC5-RRC connection may be performed at any time before operation 1210 or before operation 1260. If an RRC connection between a UE and a UE is required, PC5-RRC connection of the sidelink is established and sidelink control information (SCI) is transmitted to other UEs 1202 through the PSCCH via unicast and groupcast transmission in operation 1260. At this time, the groupcast transmission of the SCI may be interpreted as group SCI. In addition, the UE transmits data to other UEs 1202 through the PSSCH via unicast and groupcast transmission in operation 1270.

Figure 13:
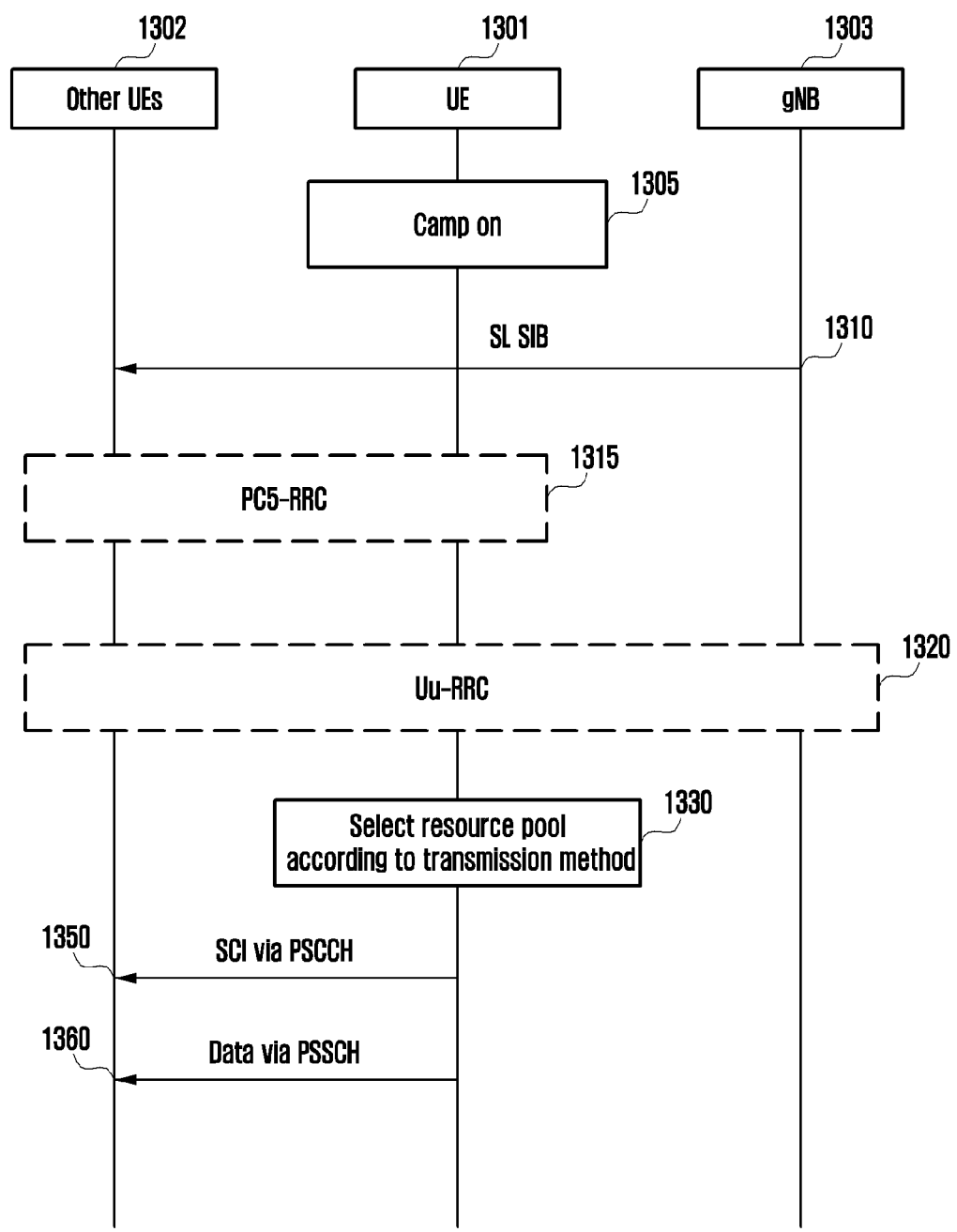
FIG. 13 illustrates an example of a method for UE autonomous resource allocation (mode 2) through a sidelink.

FIG. 13 illustrates an example of a method for UE autonomous resource allocation (mode 2) through a sidelink.

UE autonomous resource allocation (mode 2) is a method in which a base station provides a sidelink transmission/reception resource pool for V2X as system information, and the UE selects transmission resources according to a predetermined rule. Resource selection methods may include zone mapping, sensing-based resource selection, random selection, and the like. There is a difference in that, unlike the method for scheduled resource allocation (mode 1) in which the base station itself participates in resource allocation, in FIG. 13, a UE 1301 autonomously selects a resource based on a resource pool previously received through system information and transmits data. In V2X communication, a base station 1303 may allocate various types of resource pools (a V2V resource pool and a V2P resource pool) to the UE 1301. The resource pool may include a resource pool in which a UE autonomously selects an available resource pool after sensing resources used by other neighboring UEs, and a resource pool in which a UE randomly selects a resource from a preconfigured resource pool.

The UE 1301, which is camping on in operation 1305, receives a sidelink system information bit (SL SIB) from a base station 1303 in operation 1310. The system information may include resource pool information for transmission or reception, configuration information for sensing operation, information for configuring synchronization, information for inter-frequency transmission or reception, and the like. The major difference between operations of FIGS. 12 and 13 is that, in FIG. 12, the base station 1203 and the UE 1201 operate in a state in which the RRC is connected, whereas, in FIG. 13, the base station and the UE may operate even in an idle mode 1320 in which the RRC is not connected. Further, even in a state where the RRC is connected, the base station 1303 itself may not participate in resource allocation and the UE 1301 is allowed to autonomously select a transmission resource. Here, the RRC connection between the UE 1301 and the base station 1303 may be referred to as Uu-RRC. If data traffic for V2X is generated in the UE 1301, the UE 1301 selects a resource pool in a time/frequency domain according to a configured transmission operation, among resource pools received through system information from the base station 1303 in operation 1330.

Next, in the case of broadcast transmission, the UE 1301 may not need to have an additional RRC configuration of the sidelink in operation 1320, and the UE 1301 broadcasts sidelink control information (SCI) to other UEs 1302 through the PSCCH via broadcast transmission in operation 1350. In addition, the UE broadcasts data to other UEs 1302 through the PSSCH in operation 1360.

Alternatively, in the case of unicast and groupcast transmission, the UE 1301 may establish an RRC connection with other UEs 1302 on a one-to-one basis. Here, in order to differentiate from the Uu-RRC, the RRC connection between a UE and a UE may be referred to as PC5-RRC. Even in the case of groupcast communication, PC5-RRCs are individually connected between UEs belonging to a group. The connection may be similar to the connection of the RRC layer in a connection between a base station and a UE in a conventional NR uplink and downlink, and the connection in the RRC layer phase through the sidelink may be called PC5-RRC. UE capability information for sidelink may be exchanged through the PC5-RRC connection, or configuration information necessary for signal transmission or reception may be exchanged. In FIG. 13, the PC5-RRC connection 1315 is illustrated as being performed after operation 1310, but may be performed at any time before operation 1310 or before operation 1350. If an RRC connection between a UE and a UE is required, PC5-RRC connection of the sidelink is established in operation 1340 and sidelink control information (SCI) is transmitted to other UEs 1302 through the PSCCH via unicast and groupcast transmission in operation 1350. At this time, the groupcast transmission of the SCI may be interpreted as group SCI. In addition, the UE transmits data to other UEs 1302 through the PSSCH via unicast and groupcast transmission in operation 1360.

In the disclosure, a sensing window A and a sensing window B are defined in order to effectively perform sensing in a situation where periodic and aperiodic traffic coexist.

Figure 14A:
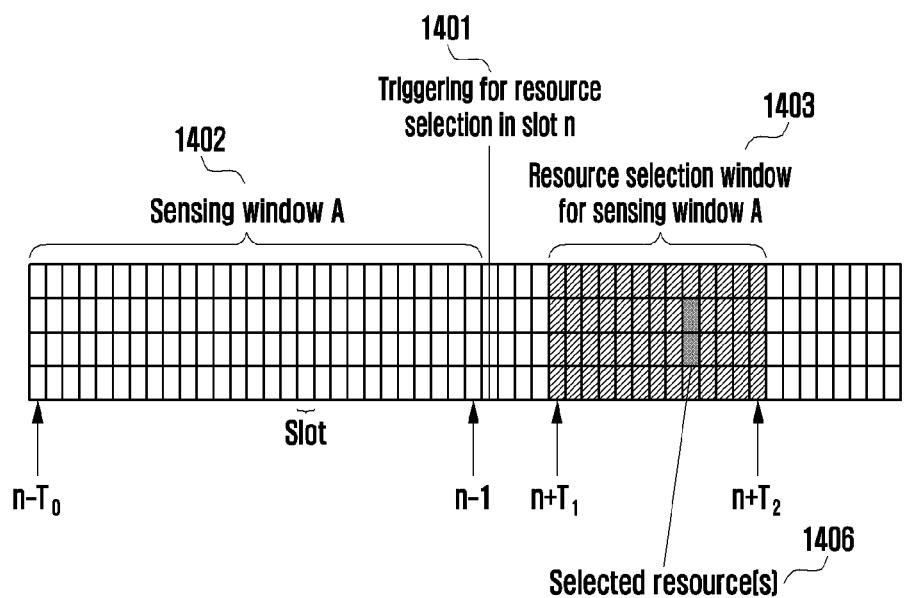
FIG. 14A illustrates an example of a method for configuring sensing window A for UE autonomous resource allocation (mode 2) of a sidelink.
Figure 14B:
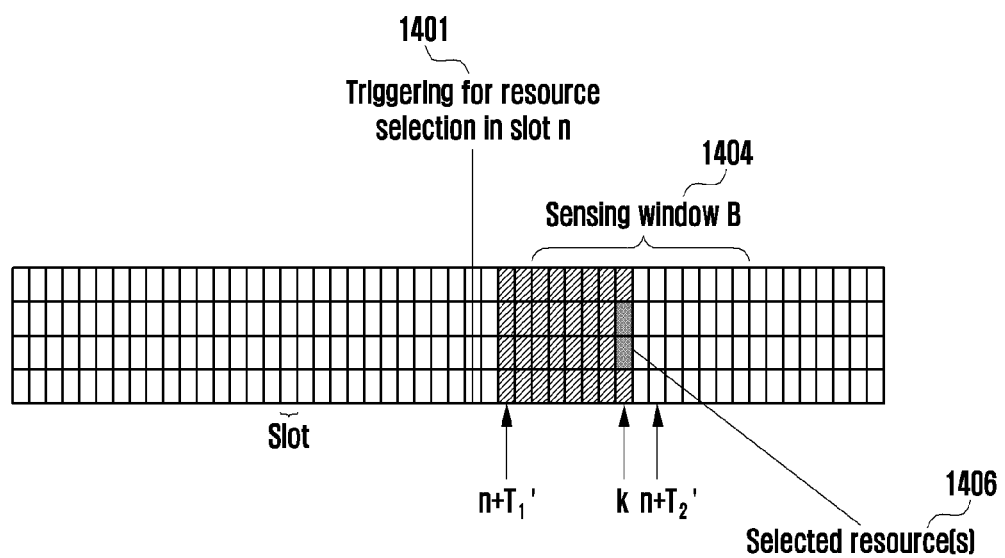
FIG. 14B illustrates an example of a method for configuring sensing window B for UE autonomous resource allocation (mode 2) of a sidelink.
Figure 14C:
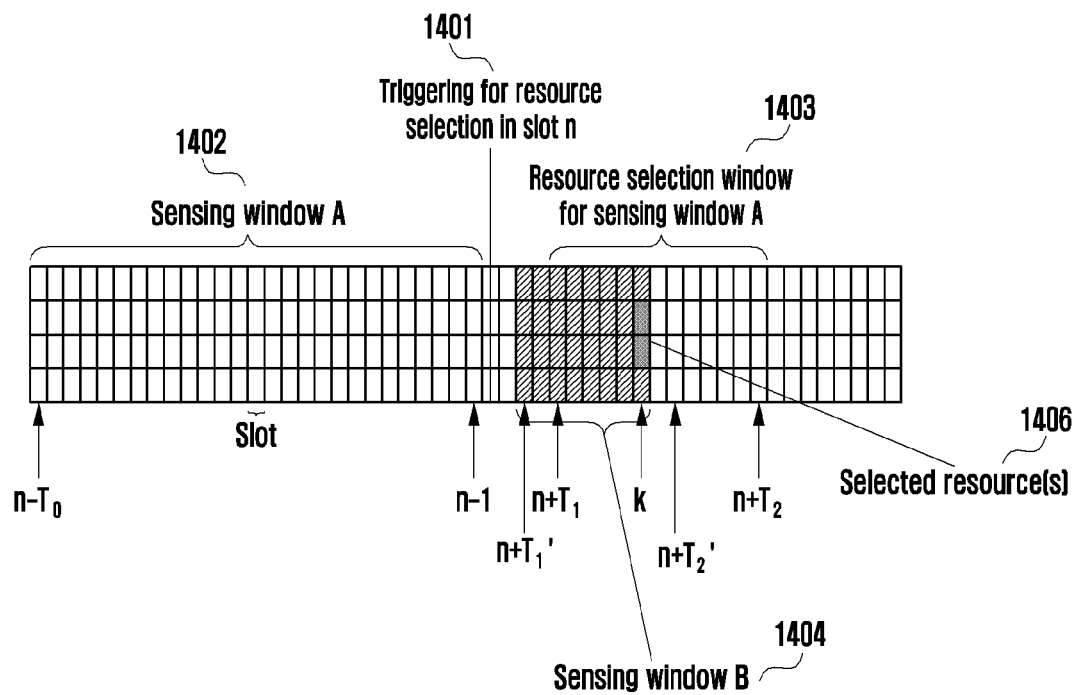
FIG. 14C is an example of a method for configuring sensing window A and sensing window B for UE autonomous resource allocation (mode 2) of a sidelink.

FIG. 14A illustrates an example of a method for configuring sensing window A for UE autonomous resource allocation (mode 2) of a sidelink, FIG. 14B illustrates an example of a method for configuring sensing window B for UE autonomous resource allocation (mode 2) of a sidelink, and FIG. 14C is an example of a method for configuring sensing window A and sensing window B for UE autonomous resource allocation (mode 2) of a sidelink.

As shown in FIG. 14A, in the case where triggering for selection of a transmission resource occurs in slot n (indicated by reference numeral 1401), the sensing window A 1402 may be defined as follows.

Sensing window A may be defined as a slot interval of [n−T0, n−1]. Here, T0 may be determined as a fixed value or may be determined to be a configurable value.

As an example of a case where T0 is determined as a fixed value, T0 may be represented by 1000*2µ for periodic traffic. Alternatively, T0 may be configured as a fixed value of 100*2µ for aperiodic traffic. The fixed T0 value of the above example may be changed to another value according to considered traffic characteristics, and may be fixed as the same value for periodic and aperiodic traffic. Here, µ is an index corresponding to numerology and is configured to the following value according to subcarrier spacing (SCS).

SCS=15 kHz, µ=0
SCS=30 kHz, µ=1
SCS=60 kHz, µ=2
SCS=120 kHz, µ=3

For the case where T0 is determined to be configurable, the configuration for the determination may be indicated through sidelink system information bit (SL SIB) or UE specific higher level signaling. If the determination is indicated through SL SIB, a corresponding value may be configured in resource pool information among corresponding system information. The case where T0 is configured in the resource pool information denotes that a predetermined T0 is always used in the resource pool.

In the sensing window A, SCI decoding and sidelink measurement for other UEs may be performed.

From the SCI received in the sensing window A, resource allocation information for other UEs and QoS information for packets may be obtained. Here, the resource allocation information may include a reservation interval for the resource. In addition, the QoS information may include latency, reliability, a minimum required communication range for transmitted traffic, and priority information according to data rate requirements. Position information for other UEs may be obtained from the received SCI. TX-RX distance may be calculated from position information of another terminal and position information of terminal itself.

Side link reference signal received power (SL RSRP) may be measured from the SCI received in the sensing window A.

Sidelink received signal strength indicator (SL RSSI) may be measured in the sensing window A.

Sensing window A may be mainly used in order to determine a resource for UE autonomous resource allocation (mode 2) through sensing of periodic traffic. If it is determined that it is not effective to identify periodic resource allocation information of another terminal through the SCI decoding and to allocate a transmission resource to a resource, which is used by the another terminal, using results of sidelink measurement such as SL RSRP or SL RSSI, the corresponding resource may be excluded in a resource selection window 1403. As illustrated in FIG. 14A, if triggering for selection of a transmission resource occurs in slot n (indicated by reference numeral 1401), the resource selection window 1403 may be defined as follows.

Resource selection window may be defined as a slot interval of [n+T1, n+T2]. Here, T1 and T2 may be determined as fixed values or may be determined to be configurable values. Alternatively, T1 and T2 are determined to be in a fixed range, and the UE may configure appropriate values thereof within a fixed range in consideration implementation.

As an example in which T1 and T2 are determined to be in a fixed range and the UE configures appropriate values thereof within a fixed range in consideration of implementation, the values may be configured as a UE implementation in a range of T1≤4 and 20≤T2≤100.

A final transmission resource 1405 may be selected in the resource selection window by using the result of sensing performed in the sensing window A.

If sensing is performed using only the sensing window A, as shown in FIG. 14A, and transmission resource selection is performed through the sensing, the following transmission resource selection method may be used.

Transmission Resource Selection Method-1

Operation 1: The number of resource candidates Mtotal that can allocate resources is determined, based on resource pool information, in the resource selection window 1403. Details of Operation 1 can be understood by referring to Embodiment 1.

Operation 2: By using the result of sensing in the sensing window A 1402, resources that are determined to be ineffective to be occupied and used by another terminal, in the resource selection window 1403, are excluded, and X (≤Mtotal) number of resource candidates that can allocate resources are left. A method for excluding resources may be used by performing SCI decoding and sidelink measurement of another terminal.

Operation 3: The resource candidate list X is reported to a higher layer of a UE, and the final transmission resource is randomly selected from among the X candidates via the higher layer of the UE (indicated by reference numeral 1406).

As illustrated in FIG. 14B, in the case where triggering for selection of a transmission resource occurs in slot n (indicated by reference numeral 1401), the sensing window B 1404 may be defined as follows.

Sensing window B may be defined as a slot interval of [n+T1', n+T2']. Here, T1' and T2' may be determined as fixed values or may be determined to be configurable. Alternatively, T1' and T2' are determined to be in a fixed range, and the UE may configure an appropriate value within a fixed range in consideration of implementation. Further, in the case where k indicates a slot in which a resource is finally selected, the sensing window B is stopped in the slot k, and the sensing window B at this time becomes [n+T1', k].

T1' and T2' may be configured to be the same values as those of T1 and T2 in the resource selection window 1403, respectively, or may be configured to different values.

For example, if T1' is configured to be 0, T1' denotes that sensing is performed from a triggering slot n for selection of a transmission resource.

Sensing window B may be configured as one slot or one or more slots according to the configured values of T1' and T2'.

In the sensing window B, SCI decoding and sidelink measurement for other UEs may be performed.

Details of the sensing operation in the sensing window B can be understood by referring to embodiments 2 and 3.

Sensing window B may be used in order to determine resources for UE autonomous resource allocation (mode 2) through additional sensing of periodic and aperiodic traffic to the sensing window A. The sensing window B, which is configured after triggering slot n for selecting a transmission resource, enables sensing of aperiodic traffic that cannot be predicted in the sensing window A, using a sidelink measurement for a slot to which an actual transmission resource can be allocated. Sensing through the sensing window B may be understood as an operation of performing sensing of traffic, which is sensed in each slot regardless of whether the traffic is periodic or aperiodic. If sensing is performed using the sensing window B as shown in FIG. 14B and accordingly transmission resource selection is performed, the following transmission resource selection method may be used.

Transmission Resource Selection Method-2

Operation 1: Sensing is performed in the corresponding slot in the sensing window B (1404) so as to determine whether the corresponding resource is in an idle state.

The allocation unit of resources in the frequency domain may be A(≥1) sub-channels or may be defined as all sub-channels. The number of resource candidates Ntotal that can allocate resources in a corresponding slot is determined according to a resource allocation unit in the frequency domain.

Sensing may be performed through SCI decoding and sidelink measurement.

Operation 2-1: If the corresponding resource is determined to be in an idle state through sensing in Operation 1, the final transmission resource 1406 is determined among the number of resource candidates Ntotal that can allocate resources in the corresponding slot.

Operation 2-2: If the corresponding resource is determined to be in a busy state through sensing in operation 1, the following operation may be selected.

If the next slot is also configured via the sensing window B 1404, go to the next slot and perform operation 1.

If the next slot is not configured via the sensing window B 1404, the following operation can be considered.

The final transmission resource 1406 is determined by using QoS information or the result of energy detection in a current slot. QoS information includes priority, latency, reliability, proximity service (ProSe) per-packet priority (PPPP), prose per-packet reliability (PPPR), a minimum required communication range for transmitted traffic, and priority information according to data rate requirements. The priority may denote PPPP and PPPR, and may be a value selected from a range within a certain value, and data that needs to be transmitted on the sidelink may include one priority value.

The transmission in the current slot may be canceled and a backoff operation may be performed.

As defined through FIGS. 14A and 14B, the sensing window A and the sensing window B may be classified based on a time point at which triggering for selecting a transmission resource occurs. Specifically, a sensing interval, which is configured before triggering slot n for selection of a transmission resource, may be defined as the sensing window A and a sensing interval, which is configured after triggering slot n, may be defined as the sensing window B.

FIG. 14C is an example of a case where the sensing window A and the sensing window B are configured at the same time. If triggering for selection of a transmission resource occurs in slot n (indicated by reference numeral 1401), the sensing window A 1402 and the sensing window B 1404 can be understood by referring to the definition described above. If sensing is performed using both the sensing window A and the sensing window B, as shown in FIG. 14c, and accordingly selection of the transmission resource is performed, the following transmission resource selection method may be used.

Transmission Resource Selection Method-3

Operation 1: The number of resource candidates $M_{total}$ that can allocate resources is determined, based on resource pool information, in the resource selection window 1403.

Operation 2: By using the result of sensing in the sensing window A 1402, resources that are determined to be ineffective to be occupied and used by another terminal, in the resource selection window 1403, are excluded, and X (≤Mtotal) number of resource candidates that can allocate resources are left. A method for excluding resources may be used by performing SCI decoding and sidelink measurement of another terminal.

Operation 3: The resource candidate list X is reported to a higher layer of a UE, and Y candidates are randomly down-selected from among X candidates in the higher layer.

Operation 4-1: If the sensing window B 1404 is included in the resource selection window 1403, the UE selects the final transmission resource 1406, based on the transmission resource selection method-2, among the Y candidates determined in the higher layer, by using the sensing result of the sensing window B 1404 in the physical layer.

The case where the sensing window B 1404 is included in the resource selection window 1403 corresponds to an interval of [n+T1, k] in FIG. 14C. The condition may be determined by the configuration of T1 and T2 and T1' and T2'.

Operation 4-2: In the case where the sensing window B is not included in the resource selection window 1403, the final transmission resource 1406 is selected, based on the transmission resource selection method-2, using the sensing result in the sensing window B in the physical layer.

The case where the sensing window B 1404 is not included in the resource selection window 1403 corresponds to an interval of [n+T1', n+T1-1] in FIG. 14C. The condition may be determined by the configuration of T1 and T2 and T1' and T2'.

In the transmission resource selection method-3, an operation (operation 3) of selecting Y candidates from the higher layer may be omitted and the following method may be used.

Transmission Resource Selection Method-4

Operation 1: The number of resource candidates Mtotal that can allocate resources is determined, based on resource pool information, in the resource selection window 1403.

Operation 2: By using the result of sensing in the sensing window A 1402, resources that are determined to be ineffective to be occupied and used by another terminal, in the resource selection window 1403, are excluded, and X (≤Mtotal) number of resource candidates that can allocate resources are left. As a method for excluding resources, SCI decoding and sidelink measurement of another terminal may be performed.

Operation 3-1: If the sensing window B 1404 is included in the resource selection window 1403, the UE selects the final transmission resource 1406, based on the transmission resource selection method-2, among the X candidates, by using the sensing result of the sensing window B 1404 in the physical layer.

The case where the sensing window B 1404 is included in the resource selection window 1403 corresponds to an interval of [n+T1, k] in FIG. 14C. The condition may be determined by the configuration of T1 and T2 and T1' and T2'.

Operation 3-2: In the case where the sensing window B is not included in the resource selection window 1403, the final transmission resource 1406 is selected, based on the transmission resource selection method-2, using the sensing result in the sensing window B in the physical layer.

The case where the sensing window B 1404 is not included in the resource selection window 1403 corresponds to an interval of [n+T1', n+T1-1] in FIG. 14C.

The condition may be determined by the configuration of T1 and T2 and T1' and T2'.

In the case where the sensing window A and the sensing window B are configured at the same time, the final resource selection may be determined by the resource selection window 1403 and the sensing window B 1404. The transmission resource selection method-3 or the transmission resource selection method-4 proposed above simultaneously configures the sensing window A and the sensing window B to perform sensing in a situation where periodic and aperiodic traffic coexist and accordingly optimize the transmission resource selection.

Implementation of the operation of sensing and transmission resource selection in the UE autonomous resource allocation (mode 2) of the sidelink described above may be performed in various methods. For example, in the case where the sensing window A and the sensing window B are configured at the same time, the UE may be implemented such that the UE always performs sensing of the sensing window A, and if triggering for selection of a transmission resource occurs in slot n, the UE performs sensing of the sensing window B and accordingly selects the final transmission resource. However, since the operation in which the UE always performs sensing of the sensing window A may use the sensing result of the sensing window A at any time, there may be an advantage in terms of latency in selection of transmission resources, but may be a disadvantage in terms of UE energy consumption. Therefore, according to another method, the UE may be implemented such that, in the case where traffic that needs to be transmitted occurs, the UE immediately performs sensing of the sensing window A, and if triggering for selection of a transmission resource occurs in slot n, the UE performs sensing of the sensing window B and accordingly select a final transmission resource. According to another method, there may be an advantage of minimizing the energy consumption of the UE by performing sensing only as needed, but there may be a disadvantage in terms of latency in selection of transmission resources.

In the above, an example of the operation of finding an empty frequency-time resource for device to device communication through a sidelink and transmitting a signal in the found resource has been described, but the method and apparatus provided in the disclosure are not limited thereto, and may be applied to various channel occupancy and channel reservation methods.

Figure 15A:
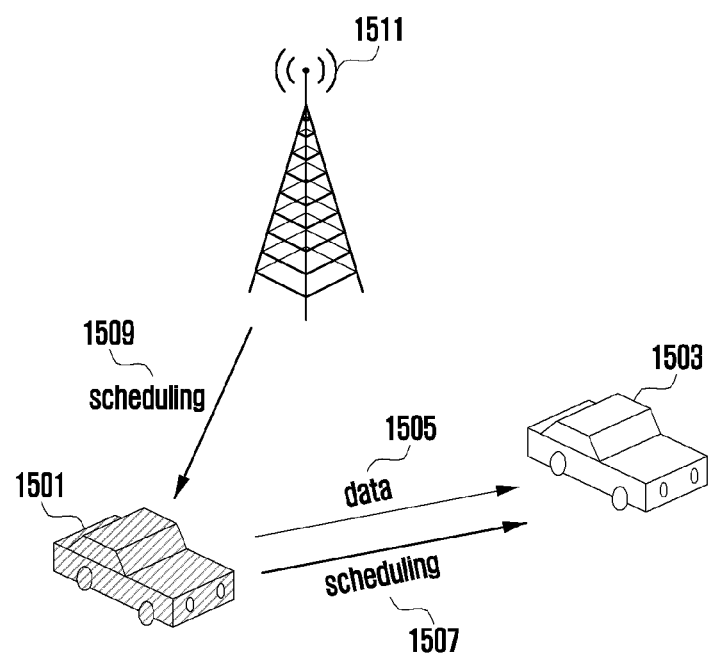
FIG. 15A illustrates a mode 1 method, which is a method for receiving scheduling information from a base station and performing sidelink data transmission.

FIG. 15A illustrates a "Mode 1" method, which is a method for receiving scheduling information and performing sidelink data transmission, as shown in FIG. 12 above. In the disclosure, a method for receiving scheduling information from a base station and performing sidelink communication based on the scheduling information is called "Mode 1", but may be called differently therefrom. A UE 1501 for performing transmission through a sidelink receives scheduling information 1509 for sidelink communication from a base station 1511. In the disclosure, the UE 1501 for performing data transmission through the sidelink may be called a transmission terminal, and a UE 1503 for performing data reception through the sidelink may be called a reception UE. However, each of the transmission terminal 1501 and the reception UE 1503 may perform data transmission or reception through the sidelink. Scheduling information 1509 for sidelink communication may be obtained by receiving downlink control information (DCI), and the DCI may include the following pieces of information.

Carrier indicator, which may be used for a purpose of scheduling sidelink for another carrier in the state where carrier aggregation (CA) has been applied;

Lowest index at the allocation of sub-channels for initial transmission, which may be used to allocate a frequency resource at initial transmission;

Information to be included in sidelink control information such as frequency resource allocation information, which may include resource allocation information or resource reservation information for initial transmission, retransmission, and N number of transmissions after the transmissions;

Information on time interval between initial transmission and retransmission;

Information relating to a sidelink slot structure, where the information may include information relating to which slots and symbols can be used for sidelink;

HARQ-ACK or/and CSI feedback timing information, where the information may include timing information for transmitting a HARQ-ACK feedback or a CSI feedback to a base station through a sidelink;

Recipient ID: which is ID information relating to terminals which are to perform reception; and QoS information such as priority, which is information relating to a priority by which data is to be transmitted The scheduling may be used for scheduling for one-time transmission of a sidelink, or may be used for periodic transmission, semi-persistent scheduling (SPS), or a configured grant transmission method (configured grant). Scheduling methods may be distinguished by an indicator included in DCI, an RNTI scrambled to a CRC added to the DCI, or an ID value. 0 bits, etc. may be added to the DCI to allow the size of the DCI to be identical to that of another DCI format of the DCI for downlink scheduling or uplink scheduling.

The transmission terminal 1501 receives DCI for sidelink scheduling from the base station 1511, transmits a PSCCH including sidelink scheduling information 1507 and transmits a PSSCH which is data corresponding to the information (indicated by reference numeral 1505). The sidelink scheduling information 1507 may be sidelink control information (SCI), and the SCI may include the following pieces of information:

HARQ process number, which is a HARQ process ID for an operation relating to a HARQ of transmitted data;

New data indicator (NDI) which is information relating to whether data which is currently being transmitted is new data;

Redundancy Version, which is information relating to which parity bit is transmitted at the time of mapping after channel coding of data;

Layer-1 source ID, which is ID information in a physical layer, of a terminal that performs transmission;

Layer-1 destination ID, which is ID information in a physical layer, of a terminal that performs reception;

Frequency-domain resource assignment for scheduling PSSCH, which is frequency domain resource configuration information of transmitted data;

MCS, which is information on modulation order and coding rate;

QoS indication, which may include priority, target latency/delay, target distance, target error rate, etc.;

Antenna port(s), which is information on an antenna port for data transmission;

DMRS sequence initialization, which may include information such as an ID value for initializing a DMRS sequence;

PTRS-DMRS association, which may include information relating to PTRS mapping;

CBGTI, which may be used as an indicator for retransmission by the units of CBGs;

Resource reservation, which is information for resource reservation;

Time gap between initial transmission and retransmission, which is information on a time interval between initial transmission and retransmission;

Retransmission index, which is an indicator of identifying retransmission;

Transmission format/cast type indicator, which is an indicator of identifying a transmission format or distinguishing between unicast/groupcast/broadcast;

Zone ID which is location information of a transmission terminal;

NACK distance, which is a reference indicator of determining whether a reception terminal is required to transmit a HARQ-ACK/NACK;

HARQ feedback indication, which may include whether a HARQ feedback is required to be transmitted, or whether a HARQ feedback is being transmitted;

Time-domain resource assignment for scheduling PSSCH, which is time domain resource information of transmitted sidelink data;

Second SCI indication, which is an indicator including mapping information of second SCI in the case of two-stage control information; and DMRS pattern which is information on a DMRS pattern (for example, the position of a symbol through which a DMRS is mapped).

The control information may be transmitted to the reception terminal after being included in a single piece of SCI, or may be transmitted after being included in two pieces of SCI. The transmission through two pieces of SCI may be called a 2-stage SCI method.

Figure 15B:
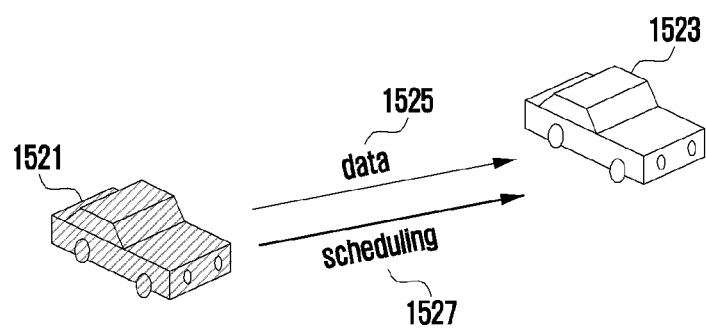
FIG. 15B illustrates a mode 2 method, which is a method for performing sidelink data transmission without receiving scheduling information from a base station.

FIG. 15B illustrates an example of a "Mode 2" method that is a method of performing sidelink communication without receiving scheduling information from a base station. In the disclosure, a method for performing sidelink communication by a determination of a transmission terminal 1521 without receiving scheduling information from a base station is called Mode 2, but can be called differently therefrom. The transmission terminal 1521 transmits a PSCCH including sidelink scheduling information 1527 to a reception terminal 1523 (indicated by reference numeral 1527), and transmits a PSSCH corresponding to the information to the reception terminal 1523 (indicated by reference numeral 1525). The sidelink scheduling information 1527 may include SCI, and the SCI may include information identical or similar to SCI information of Mode 1.

In the disclosure, a downlink (DL) may indicate a link through which a signal is transmitted from a base station to a terminal. In the disclosure, an uplink (UL) may indicate a link transmitted from a terminal to a base station.

The disclosure provides a method for transmitting feedback including HARQ-ACK feedback by a terminal which has received data through a sidelink, and a method and apparatus for receiving feedback including HARQ-ACK feedback by a terminal which has transmitted data.

First Embodiment

The first embodiment provides a method and apparatus for determining a reference time value having a minimum time difference for transmission of HARQ-ACK feedback.

Figure 16A:
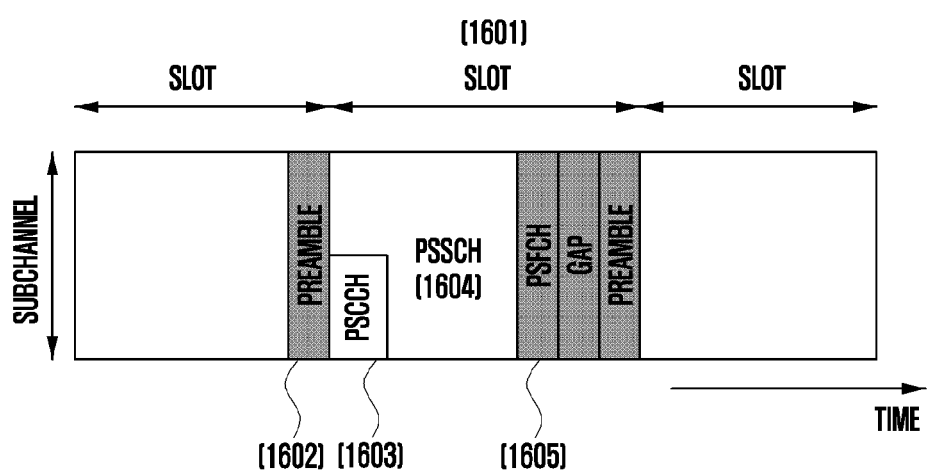
FIG. 16A illustrates an example of a mapping structure of physical channels mapped to one slot through a sidelink.

FIG. 16A illustrates an example of a mapping structure of physical channels mapped to one slot through a sidelink. The transmission terminal may transmit a preamble signal 1602 through one or more symbols before transmitting the corresponding slot 1601. The preamble signal may be used to allow the reception terminal to correctly perform automatic gain control (AGC) for adjusting the intensity of amplification if the reception terminal amplifies the power of a reception signal. Further, transmission of the preamble signal may be determined according to whether the transmission terminal transmits a previous slot of the corresponding slot 1601. That is, if the corresponding transmission terminal transmits a signal to the same terminal in the previous slot of the corresponding slot 1601, the transmission of the preamble signal may be omitted. A PSCCH 1603 including control information is transmitted through initial symbols of the slot 1601, and a PSSCH a-04 scheduled by the control information of the PSCCH 1603 may be transmitted through the initial symbols of the slot 1601 or subsequent symbols thereof. A part of sidelink control information (SCI), which is control information, may be mapped and transmitted to the PSSCH (1604). In addition, FIG. 16A shows an example in which a physical sidelink feedback channel (PSFCH) 1605, which is a physical channel for transmitting feedback information, is located at the end of the slot 1601. A certain period of empty time is secured between the PSSCH a-04 and the PSFCH 1605, and thus a terminal, which has transmitted or received the PSSCH a-04, is enabled to prepare transmission or reception of the PSFCH 1605. After the transmission or reception of the PSFCH 1605, an empty interval may be secured for a certain period of time.

In an embodiment, the terminal may previously receive a configuration of the position of a slot to which the PSFCH is transmitted. The previous reception of the configuration by the terminal may be determined in advance in the process of creating a slot, may be transmitted in the case of connecting to a sidelink-related system, may be transmitted from the base station in the case of connecting to the base station, or may be received from another terminal.

Figure 16B:
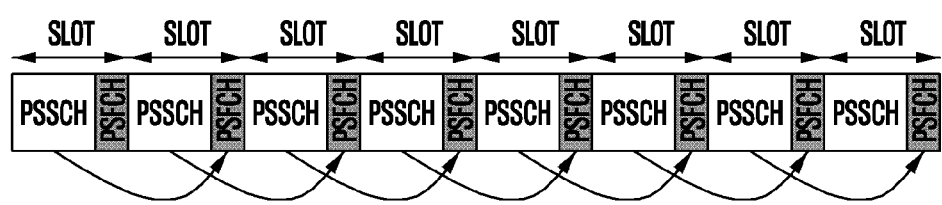
FIG. 16B illustrates an example in which resources capable of transmitting or receiving a PSFCH are configured in every slot.

FIG. 16B illustrates an example in which a resource capable of transmitting or receiving a PSFCH is configured for each slot. For example, if a period of a resource capable of transmitting or receiving a PSFCH can be configured by a parameter such as periodicity_PSFCH_resource, FIG. 16B may be the case where periodicity_PSFCH_resource corresponds to 1 slot. Alternatively, the period may be configured in millisecond (msec) units, and configuration of a resource for transmission of the PSFCH is available in every slot according to subcarrier spacing (SCS). In FIG. 16B, feedback information for a PSSCH, which has been received through scheduling in slot n, may be transmitted through a PSFCH in slot (n+1).

Figure 16C:
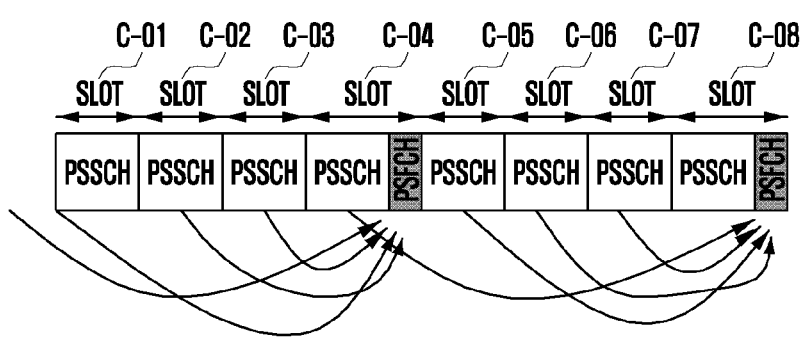
FIG. 16C illustrates an example in which resources are configured to transmit or receive a PSFCH every 4 slots.
Figure 16D:
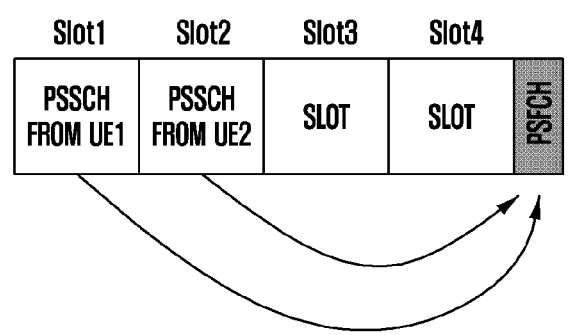
FIG. 16D illustrates a case where UE 1 and UE 2 are connected via unicast or groupcast communication through a sidelink to perform signal transmission/reception and a PSFCH needs to be transmitted through the same slot in order to transmit HARQ-ACK feedback for a PSSCH transmitted by each of UE 1 and UE 2.
Figure 16E:
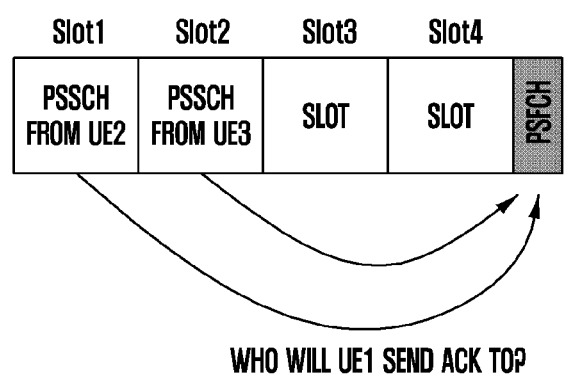
FIG. 16E illustrates a case where UE 1 is connected to UE 2 and UE 3 via unicast or groupcast communication, respectively, to perform signal transmission/reception and two PSFCHs need to be transmitted through the same slot in order to transmit HARQ-ACK feedback for a PSSCH transmitted to UE 1 by each of UE 2 and UE 3.

FIG. 16C illustrates an example in which resources are configured to transmit or receive PSFCH every four slots. FIG. 16C illustrates an example having a configuration such that a PSFCH is transmitted or received only in the last slot c-04 among four slots c-01, c-02, c-03, and c-04. Similarly, FIG. 16 illustrates an example in which a PSFCH c-13 is configured to be transmitted or received only in the last slot c-08 among four slots c-05, c-06, c-07, and c-08. The index of the slot may be a slot determined in a resource pool. That is, the four slots c-01, c-02, c-03, and c-04 are not physically contiguous slots, but may be slots that appear consecutively among slots belonging to a resource pool (or slot pool) used by a transceiver. The arrow of FIG. 16C may indicate a slot of the PSFCH to which HARQ-ACK feedback information of the PSSCH is transmitted. For example, HARQ-ACK information of the PSSCH transmitted (or scheduled) in slots c-01, c-02, and c-03 is included in the PSFCH c-11 that can be transmitted through slot c-04 and transmitted or received. Similarly, HARQ-ACK information of the PSSCH transmitted (or scheduled) in slots c-04, c-05, c-06, and c-07 is included in the PSFCH c-13 that can be transmitted through slot c-08 and transmitted or received. The case where the HARQ-ACK feedback information of the PSSCH transmitted in the slot c-04 is not transmitted through the same slot c-04 may occur because the terminal may have insufficient time to finish decoding of the PSSCH transmitted through slot c-04 and transfer the PSFCH in the same slot c-04. That is, the case may occur because the minimum processing time required to process the PSSCH and prepare the PSFCH is not sufficiently small.

In the case where the terminal transmits or receives the PSFCH, the number of HARQ-ACK feedback bits included in the PSFCH needs to be known and thus the transmission or reception can be correctly performed. The number of HARQ-ACK feedback bits included in the PSFCH and determination whether to include PSSCH HARQ-ACK bits may be determined based on a combination of at least one of the following parameters.

- Period of a slot for which PSFCH transmission and reception is enabled by a parameter such as periodicity_PSFCH_resource
- Whether HARQ-ACK bundling is performed. The HARQ-ACK bits of PSFCH, transmitted in a predetermined number of slots before PSFCH transmission or reception, may be a value determined through an AND operation. (In other words, if one is a NACK bit, the HARQ-ACK bits are determined as NACK)
- The number of transport blocks (TB) included in the PSSCH
- Whether to use and configure code block group (CBG) unit retransmission
- Whether HARQ-ACK feedback is activated
- The number of PSSCHs actually transmitted or received
- Minimum processing time (K) of a terminal required for preparation of PSSCH processing and PSFCH transmission In the case where the PSSCH is received in slot n and in the case where a resource capable of transmitting the PSFCH is configured or given in slot (n+x), a terminal that receives the PSSCH maps HARQ-ACK feedback information of the PSSCH to the PSFCH of slot (n+x) and transmit the same, using the smallest x among integers greater than or equal to K. In the above, K may be a value preconfigured by a transmission terminal, or a value configured in a resource pool in which the corresponding PSSCH or PSFCH is transmitted, and each terminal may exchange its capability with the transmission terminal in advance for the configuration.

In the above, K is a parameter indicating an interval between the PSSCH received by the terminal and a transmission slot of HARQ-ACK, and may be a value determined or configured according to the processing time capability of the terminal, that is, the ability of processing the PSSCH quickly. According to an example, a terminal capable of normal processing (which may be referred to as capability type 1 in the disclosure) may have a K value determined as 2 in the equation, and a terminal capable of rapid processing (which may be referred to as capability type 2 in the disclosure) may have a K value determined as 1 in the equation. For example, a K value may be provided as shown in Table 5 below. Information on the processing capability of the terminal may be exchanged between terminals using PC5-RRC. K may be a value determined according to at least one of subcarrier spacing (SCS), a UE capability, a configuration value with a transmission terminal, or a resource pool configuration, as provided in <Table 5> below.

TABLE 5

| SCS | K for Processing Capability Type 1 | K for Processing Capability Type 2 |
|---|---|---|
| 15 kHz | 2 | 1 |
| 30 kHz | 2 | 1 |
| 60 kHz | 3 | 2 |
| 120 kHz | 3 | 2 |

According to the method described above, for example, in the case where N=2 and K is 1, that is, in the case where a PSFCH transmission resource is configured for every N slots in the resource pool and where the PSSCH is transmitted and the HARQ-ACK of the PSSCH can be transmitted from the at least K next slots (K=1) (that is, the following slot), a slot for transmitting HARQ-ACK feedback may be determined as shown in FIG. 17. The logical slot index in a resource pool corresponding to the first column of FIG. 17 denotes an index of slots configured as a resource pool. That is, a logical slot index is allocated only to a slot configured as a resource pool among a plurality of slots, and the logical slot index is not allocated to a slot which is not configured as a resource pool. In the second column of a table in FIG. 17, a slot may indicate an index of a physical slot. In the second column field of FIG. 17, it can be identified that the slot index is allocated according to the sequence of a physical slot regardless of whether the slot is configured as a resource pool. The third column of FIG. 17 is a field indicating whether a slot corresponds to the resource pool, "O" may indicate that the corresponding slot corresponds to the resource pool, and "X" may indicate that the corresponding slot does not correspond to the resource pool. The fourth column of FIG. 17 is a field indicating whether PSFCH transmission is available. "O" indicates a slot to which PSFCH transmission is available, and "X" indicates a slot to which PSFCH transmission is not available. The slot capable of PSFCH transmission needs to correspond to the resource pool and may be determined according to an N value. The embodiment of FIG. 17 corresponds to an example in which N is 2. Therefore, PSFCH may be transmitted at every second index interval among indexes of the logical slot index in the resource pool. The fifth column of FIG. 17 indicates a slot to which the PSSCH corresponding to HARQ-ACK feedback included in the PSFCH has been transmitted. For example, the PSFCH transmitted through slot n may include HARQ feedback information for the PSSCH scheduled in slot (n−1) and slot (n−2). In analyzing the table of FIG. 17, each field analysis of the table can be interpreted in the same manner in the corresponding drawings and tables.

That is, according to FIG. 17, the number of HARQ-ACK feedback bits that the terminal needs to transmit may be 2 bits in all PSFCHs. For example, if the reception terminal does not receive the PSSCH in both slot n and slot (n+2) or does not receive the PSCCH for scheduling the PSSCH, the PSFCH including HARQ-ACK feedback information does not need to be transmitted through slot (n+3). In addition, if the PSSCH is received in slot (n+3) and the PSSCH is not received in slot (n+4) or the PSCCH for scheduling the PSSCH is not received in slot (n+4), the reception terminal may transmit 1 bit of HARQ-ACK information for slot (n+3) in slot (n+8). Alternatively, if the PSSCH is received in slot (n+3), the PSSCH is not received in slot (n+4), or the PSCCH for scheduling the PSSCH is not received, the reception terminal may transmit HARQ-ACK information for slot (n+3) and HARQ-ACK information for slot (n+4) in slot (n+8). In this case, since the reception terminal has not received the PSSCH in slot (n+4), HARQ-ACK feedback for slot (n+4) may be configured to be NACK and transmit the feedback.

That is, if the reception terminal transmits the PSFCH in a specific slot by considering a slot included in the resource pool, a slot for which the PSFCH resource is configured, a period N in which the PSFCH resource is configured, and K which is configured or determined according to the processing time of the terminal, the reception terminal may determine the number of HARQ-ACK feedback bits to be included in the PSFCH. The determined number of HARQ-ACK feedback bits may be determined by the following equation.

The number of HARQ-ACK bits to be included in a PSFCH transmitted through slot $n$=the number of slots included in a corresponding resource pool from slot$(k-K+1)$ to slot$(n-K)$  [Equation 2]

In <Equation 2>, slot k may be a slot including a PSFCH resource, which is configured to be transmitted immediately before the PSFCH that can be transmitted through slot n. Therefore, in the case where N and K are given, the maximum number of HARQ-ACK feedback bits that the terminal needs to transmit through one PSFCH may be determined as illustrated in FIG. 18.

That is, in the example of FIG. 18, by considering from slot (n−K−N+1−K+1) to slot (n−K), as many HARQ-ACK feedback bits as the number of the corresponding slots may be transmitted to the PSFCH of slot n. It is obvious that in the case where the terminal has not received a PSSCH through the slot (nK−N+1−K+1) to the slot (nK) or has not received a PSCCH for scheduling the PSSCH, there is no need to transmit the PSFCH through slot n. In the case where N and K described above are given, the maximum number of HARQ-ACK feedback bits that the terminal needs to transmit through one PSFCH can be given by Equation 3 below.

The maximum number of HARQ-ACK feedback bits that a terminal needs to transmit through one PSFCH=$(N+K-1)$  [Equation 3]

For example, in the case where N=2 and K is 2, that is, in the case where PSFCH transmission resource is configured for every N slots in the resource pool, and where the PSSCH is transmitted and the HARQ-ACK of the PSSCH can be transmitted from the at least K next slots (K=2) (that is, two slots later), a slot for transmitting HARQ-ACK feedback may be determined as shown in FIG. 19.

That is, in FIG. 19, the number of HARQ-ACK feedback bits to be transmitted by the terminal may be 1 bit, 2 bits, or 3 bits depending on a slot. For example, a PSFCH including HARQ-ACK feedback information in slot (n+2), slot (n+3), and slot (n+4) may be transmitted through slot (n+8). If control information for scheduling at least one PSSCH among slot (n+2), slot (n+3), or slot (n+4) is received, the PSFCH including HARQ-ACK feedback information of 3 bits is transmitted. A slot in which the PSSCH is not received may configure the feedback information as NACK and transmit the same.

Therefore, in the case of performing feedback transmission via sidelink unicast or groupcast communication, the number of feedback bits may be determined to be (N+K-1) as given in <Equation 3>. That is, in this method, according to an example represented in FIG. 19, (N+K−1)=2+2−1=3, and thus may be determined to always transmit 3 bits.

Alternatively, according to another example, in the case of performing feedback transmission via sidelink unicast or groupcast communication, the number of feedback bits may be determined to be the maximum number of bits that need to be transmitted in all cases by considering slots belonging to a resource pool, N, and K. That is, in this method, according to an example represented in FIG. 19, since the maximum number of bits that need to be transmitted in all cases is 3, the feedback transmission may be determined to always transmit 3 bits.

According to another example, in the case of performing feedback transmission via sidelink unicast or groupcast communication, the number of feedback bits may be used by calculating the number of slots in which the PSSCH can be transmitted, wherein the PSSCH may be related to HARQ-ACK feedback to be transmitted to the PSFCH in a slot to which the PSFCH needs to be transmitted by considering N, K, and slots belonging to the resource pool. That is, in this method, according to an example represented in FIG. 19, it may be determined that 1 bit is transmitted through slot n, 2 bits are transmitted through slot (n+3), 3 bits are transmitted through slot (n+8), 1 bit is transmitted through slot (n+12), 2 bits are transmitted through slot (n+14), and 2 bits are transmitted through slot (n+16). It is obvious that, in the above examples, if a control signal for scheduling a PSSCH or a PSSCH is not received in a slot associated with a HARQ-ACK bit, which is determined to be transmitted by the terminal, the transmission terminal is considered as not transmitting any PSSCH during the time at which the control signal for scheduling the PSSCH or the PSSCH is not received. Therefore, transmission of a PSFCH including HARQ-ACK may not be necessary.

According to another example, in the case where N=2 and K is 3, that is, in the case where PSFCH transmission resource is configured for every N slots in the resource pool, and where the PSSCH is transmitted and the HARQ-ACK of the PSSCH can be transmitted from the at least K next slots (K=3) (that is, three slots later), a slot for transmitting HARQ-ACK feedback may be determined as shown in FIG. 20.

That is, in FIG. 20, the number of HARQ-ACK feedback bits that needs to be transmitted by the terminal may be 0 bits, 1 bit, 2 bits, 3 bits, or 4 bits depending on a slot. For example, a PSFCH including HARQ-ACK feedback information in slot (n+2), slot (n+3), slot (n+4), and slot (n+5) may be transmitted through slot (n+8). If control information for scheduling at least one PSSCH among slot (n+2), slot (n+3), slot (n+4), and slot (n+5) is received, the PSFCH including HARQ-ACK feedback information of 4 bits is transmitted. A slot in which the PSSCH is not received may configure the feedback information as NACK and transmit the same.

According to another example, in the case where N=4 and K is 3, that is, in the case where PSFCH transmission resource is configured for every N slots in the resource pool, and where the PSSCH is transmitted and the HARQ-ACK of the PSSCH can be transmitted from the at least K next slots (K=3) (that is, three slots later), a slot for transmitting HARQ-ACK feedback may be determined as shown in FIG. 21.

That is, in FIG. 21, the number of HARQ-ACK feedback bits that need to be transmitted by the terminal may be 2 bits, 3 bits, 4 bits, 5 bits, or 6 bits depending on a slot. For example, a PSFCH including HARQ-ACK feedback information in slot (n+1), slot (n+2), slot (n+3), slot (n+4), slot (n+5), and slot (n+6) may be transmitted through slot (n+12). If control information for scheduling at least one PSSCH among slot (n+1), slot (n+2), slot (n+3), slot (n+4), slot (n+5), and slot (n+6) is received, the PSFCH including HARQ-ACK feedback information of 6 bits is transmitted. A slot in which the PSSCH is not received may configure the feedback information as NACK and transmit the same.

As illustrated in FIG. 21, the number of HARQ-ACK feedback bits that the terminal needs to transmit may increase to N bits or more according to N and K. In this case, information corresponding to a large number of bits needs to be transmitted in the PSFCH, and thus which may cause a disadvantage by increasing the probability of decoding errors in the PSFCH. Therefore, the terminal may transmit only the last K bit of the feedback that needs to be transmitted, and may not transmit the remaining bits. In the above, K may be the same as N, which is a PSFCH resource configuration period, but will not be limited thereto.

According to another example, in the case where N=2 and K is 3, that is, in the case where PSFCH transmission resource is configured for every N slots in the resource pool, and where the PSSCH is transmitted and the HARQ-ACK of the PSSCH can be transmitted from the at least K next slots (K=3) (that is, three slots later), a slot for transmitting HARQ-ACK feedback may be determined as shown in FIG. 22.

That is, in FIG. 22, the number of HARQ-ACK feedback bits that need to be transmitted by the terminal may be 0 bits, 1 bit, 2 bits, 3 bits, or 4 bits depending on a slot. For example, slot (n+12) may not include a sidelink slot in which the corresponding PSSCH is transmitted, wherein HARQ-ACK feedback is to be transmitted through the PSSCH. That is, there may be a case in which feedback bits to be transmitted do not exist in a PSFCH resource of a specific slot according to N, K, and resource pool configuration, and the minimum number of bits for transmitting HARQ-ACK feedback may be given by <Equation 4> below.

The minimum number of HARQ-ACK feedback bits that a terminal needs to transmit through one PSFCH=max($N-K+1,0$)     [Equation 4]

In the above, max (a, b) may denote a larger value between a and b. That is, in an example provided in FIG. 22, since the HARQ-ACK to be transmitted does not always exist in slot (n+12), the UE may consider that there is no PSFCH resource in the corresponding slot. That is, although the PSFCH resource is configured to exist, the PSFCH resource may be ignored and PSSCH transmission or reception may be performed.

In the disclosure including the current embodiment, N may be configured among values including at least one of 1, 2, and 4 as an example. However, N is not limited thereto. In addition, the above configuration may differ for each resource pool.

In the disclosure including the current embodiment, in the case of referring to HARQ-ACK, the corresponding PSSCH or a PSSCH may be a PSSCH for unicast or groupcast, transmitted from the same terminal and configured or instructed to transmit the HARQ-ACK. That is, the PSSCH that does not need to transmit HARQ-ACK may not need to apply the proposed technique. In addition, in the disclosure including the current embodiment, the PSCCH for scheduling the PSSCH may be control information for scheduling the PSSCH, and the control information may not need to be transmitted through the PSCCH. In addition, the control information may be one piece of control information, but a plurality pieces of control information may schedule one PSSCH.

In the above, a K value, which serves as the reference of a time point at which feedback transmission is performed, may be determined by the following method.

Method 1: K is fixed to 2 regardless of the size of a subcarrier. This is because, in consideration that the processing time capability of the terminal, a minimum processing time exceeding 28 symbols may not be defined in all subcarrier spacing. In the disclosure, a method for fixing K=2 is provided, but K is not limited to 2 and may be changed and applied to other values.

Method 2: The K value is determined according to the size of a subcarrier that is being used. For example, K=2 for 15 kHz and 30 kHz, and K=3 for 60 kHz and 120 kHz.

Method 3: A method in which the K value is configured or pre-configured according to the resource pool, or a method is configured according to the unicast or groupcast communication performed in the resource pool Method 4: A method determined by a combination of at least one of the following, such as the processing capability of the terminal and the time interval of PSSCH and PSFCH
  Time point at which transmission of the PSSCH ends, that is, the last symbol time
  Time point at which transmission of the PSFCH starts, that is, the first symbol time
  Processing capability of a terminal (that can be associated with baseband processing capability)
  Slot boundary point The above description may be modified, as follows, and applied. Upon receiving the PSSCH in slot n, a terminal that receives the PSSCH transmits HARQ-ACK feedback information of the PSSCH through the earliest PSFCH among PSFCHs in which an interval between the PSSCH and the PSFCH is greater than or equal to a y symbol. In the above, y may be a preconfigured value from a transmission terminal or a value configured in a resource pool in which the corresponding PSSCH or PSFCH is transmitted, and for the configuration of y, each terminal may exchange terminal capability with the transmission terminal in advance and y may be determined according to the subcarrier spacing.

Second Embodiment

Figure 23:
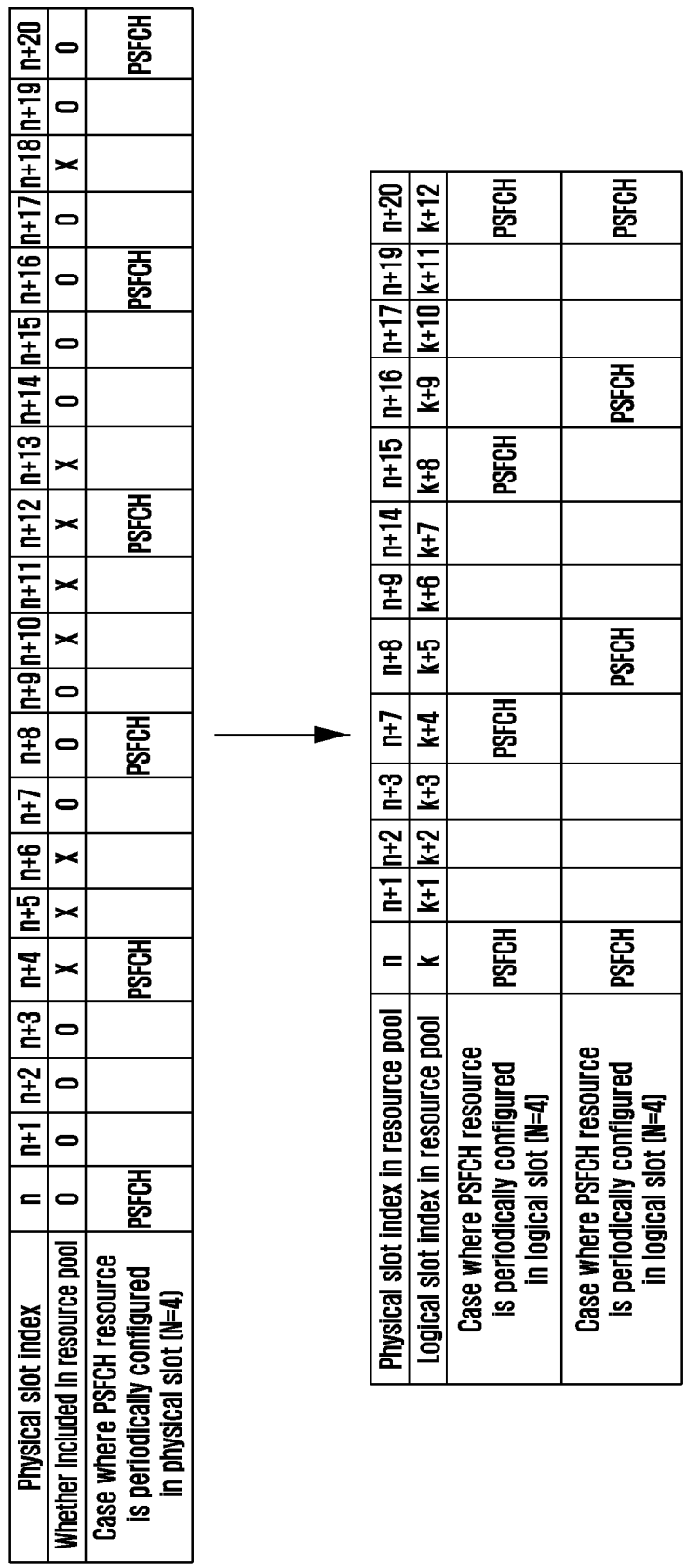
FIG. 23 illustrates an example in which physical slot indexes and logical slot indexes of slots included in a resource pool are configured in physical slots according to resource pool configuration.

A second embodiment provides a method and apparatus for determining a PSFCH to be transmitted. FIG. 23 illustrates an example in which physical slot indexes and logical slot indexes of slots included in a resource pool are configured according to resource pool configuration in physical slots. Referring to the first table of FIG. 23, in the case where the PSFCH is to be transmitted for every 4 slots according to the physical slot number, the corresponding slot is not included in the resource pool, and thus the PSFCH cannot be transmitted in the corresponding slot. Referring to the second table of FIG. 23, the third column indicates a position to which the PSFCH can be transmitted in the case where N=4 is configured based on a logical slot belonging to a resource pool. The fourth column indicates a position to which the PSFCH can be transmitted in the case where N=4 is configured based on a physical slot. Even if the N value is configured based on the physical slot, if the slot does not belong to the resource pool, the slot is available to transmit the PSFCH in a slot belonging to a resource pool of the next cycle.

FIG. 24 illustrates a method for transmitting feedback information by including the same in a PSFCH according to whether physical slots are included in a resource pool and a position of a slot for which a PSFCH resource is configured. FIG. 24 shows an example where N=4 and K=2. That is, FIG. 24 illustrates a case where PSFCH resources are configured for every 4 slots in the resource pool and feedback can be transmitted from two slots after reception of data according to the processing capability of a terminal. For example, HARQ-ACK feedback for data (PSSCH) transmitted through slot (n−1), slot n, slot (n+2), slot (n+3), and slot (n+4) may be transmitted through slot (n+8). However, if the PSFCH that may be transmitted by the terminal may transmit 1 bit or 2 bits for each PSFCH and if the terminal receives PSSCHs through all 5 slots, the terminal may determine the PSFCH to be transmitted by applying one of the following methods.

Method 1: A method for dividing and allocating by 1 bit or 2 bits to the PSFCH and transmitting multiple PSFCHs.

Method 2: A method for transmitting only HARQ-ACK for the previously transmitted PSSCH by including the same in one PSFCH.

Method 3: A method for sequentially transmitting 1 bit or 2 bits for a PSSCH having high QoS.

Method 4: A method for dividing and allocating by 1 bit or 2 bits to the PSFCH and transmitting only one PSFCH.

FIG. 24 illustrates "method 1" in more detail in the above. For example, it is determined such that HARQ-ACK feedback information of PSSCH, transmitted through slots (n−1) and n, is transmitted through one PSFCH 2401, and HARQ-ACK feedback information of PSSCH, transmitted through slots (n+2) and (n+3) is transmitted through another PSFCH 2403, and HARQ-ACK feedback information of PSSCH, transmitted through slot (n+4) is transmitted through still another PSFCH 2405. According to an embodiment, only one bit may be transmitted through the last PSFCH.

In this case, the terminal may need to transmit one or a plurality of PSFCHs depending on whether the PSSCH is received or information on whether the PSCCH for scheduling the PSSCH is received. In the case of transmitting a plurality of PSFCHs, the terminal may determine the PSFCH to be transmitted by applying one or more of the following methods. For example, the following method may be applied in the case where multiple PSSCHs are transmitted at the same time point or through the same slot.

Method a-1: Multiple PSFCHs are transmitted at the same time by allocating transmission powers of the PSFCHs, until the maximum available power of the terminal is reached, in a sequence of first allocating power to the PSFCH to which feedback of the first received PSSCH transmitted, in a sequence of slots in which the PSSCH corresponding to the HARQ-ACK feedback included in the PSFCH is transmitted, and then allocating power of the PSFCH. If the PSCCH or PSSCH corresponding to the feedback included in the PSFCH has not been transmitted, the corresponding PSFCH is not transmitted. That is, the power of the PSFCH may be assumed to be zero.

Method a-2: Power of one or a plurality of PSFCHs to be transmitted is first determined, and if the PSFCH transmission power is greater than the maximum available power Pc,max of the terminal, the PSFCH transmission power is reduced such that the total of PSFCH power to be transmitted becomes Pc,max corresponding to a ratio of the predetermined PSFCH power. Alternatively, the terminal may adjust the transmission power for a certain PSFCH and may not adjust the determined transmission power for a certain PSFCH, according to a predetermined priority. In addition, the terminal may not adjust transmission power in case of PSFCH for unicast transmission, and may adjust transmission power in case of PSFCH for groupcast transmission.

Method a-3: In the case where a plurality of PSFCHs need to be transmitted, the PSFCH including HARQ-ACK feedback information having the largest number of bits is transmitted. If a plurality of PSFCHs including HARQ-ACK feedback information having the largest number of bits exist, the terminal may randomly select a PSFCH to be arbitrarily transmitted.

Method a-4: In the case where a plurality of PSFCHs need to be transmitted, a PSFCH including feedback of unicast data may be prioritized over a PSFCH including feedback of groupcast data. That is, the PSFCH including the feedback of the groupcast data is not transmitted, but the PSFCH including the feedback of the unicast data may be transmitted.

Method a-5: In the case where a plurality of PSFCHs need to be transmitted, a PSFCH to be transmitted may be determined based on a priority or QoS value corresponding to a PSSCH corresponding to HARQ-ACK feedback included in the PSFCH. If a plurality of PSSCHs are mapped to one PSFCH, a value having the highest priority among priorities or QoS of PSSCHs may be applied.

According to method a-1, method a-2, and method a-3 described above, the methods may be applied after prioritizing HARQ-ACK feedback for unicast data transmission over HARQ-ACK feedback for groupcast data transmission.

In addition, in the case where there are multiple PSFCHs to be transmitted according to the method a-1, method a-2, and method a-3 described above, feedback corresponding to the PSSCH, which has a QoS value or a priority value lower than a threshold of a preconfigure QoS may not be transmitted.

(2-1)Th Embodiment

A (2-1)th embodiment provides a method and apparatus for transmitting feedback by a terminal, in the case of applying the second embodiment, in the case where HARQ-ACK feedback for PSSCHs transmitted from different terminals needs to be transmitted through the same slot or at the same timing.

In the above, FIG. 24 illustrates "Method 1" in more detail. For example, HARQ-ACKs for PSSCHs, transmitted through slot (n−1), slot n, slot (n+2), slot (n+3), and slot (n+4) may be mapped to separate PSCFHs and transmitted. In this case, the terminal may need to simultaneously transmit up to 5 PSFCHs. At this time, feedback may be transmitted using "methods a-1" to "method a-5" provided in the second embodiment.

The method a-1, method a-2, and method a-3 described above may be applied after prioritizing HARQ-ACK feedback for unicast data transmission over HARQ-ACK feedback for groupcast data transmission.

In addition, in the case where there are multiple PSFCHs to be transmitted according to the method a-1, method a-2, and method a-3 described above, feedback corresponding to the PSSCH, which has a QoS value or a priority value lower than a threshold of a preconfigure QoS may not be transmitted.

That is, for example, if there are three PSFCHs that the terminal needs to transmit, before applying a method for allocating or reducing the power of the three PSFCHs according to the ratio, the power of the PSFCH including feedback corresponding to the PSSCH, which has a QoS value or a priority value lower than a configured or a pre-configured QoS threshold may be determined to be 0, that is, the PSFCH may not be transmitted.

Third Embodiment

Figure 25C:
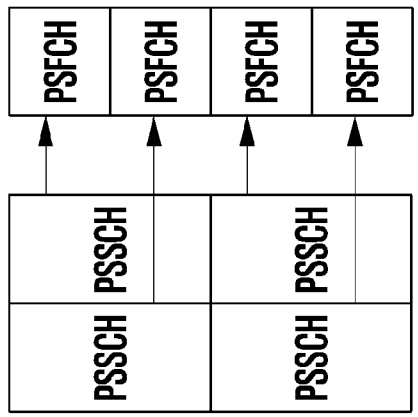
FIG. 25C illustrates a method in which a minimum unit of frequency resource allocation of a PSSCH is determined based on N, which is a slot period in a resource pool for which a PSFCH resource is configured.
Figure 25B:
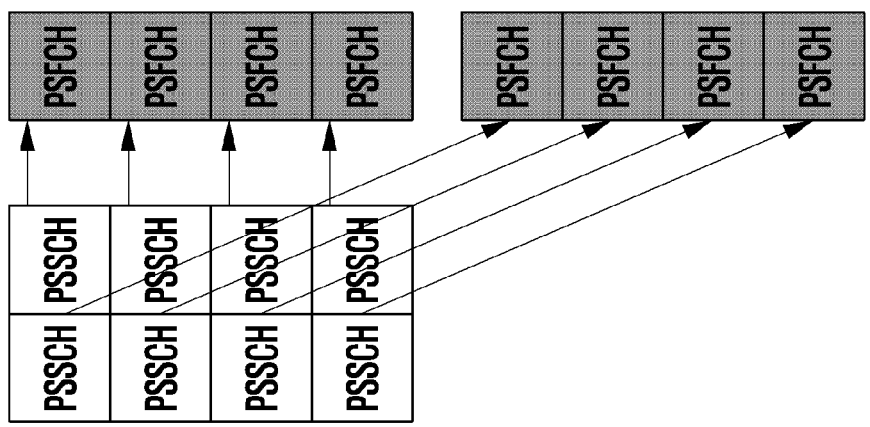
FIG. 25B illustrates a method in which a minimum unit of frequency resource allocation of a PSSCH is determined based on N, which is a slot period in a resource pool for which a PSFCH resource is configured.
Figure 25A:
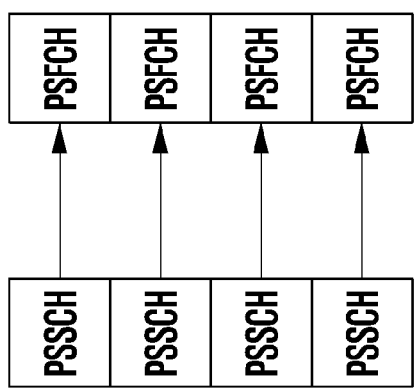
FIG. 25A illustrates a method in which a minimum unit of frequency resource allocation of a PSSCH is determined based on N, which is a slot period in a resource pool for which a PSFCH resource is configured.

A third embodiment provides a method and apparatus for determining the minimum unit of frequency resource allocation of the PSSCH based on N, which is a slot period in a resource pool in which a resource of the PSFCH is configured. In FIGS. 25A to 25C, the horizontal direction represents the time domain, and the vertical direction represents the frequency domain.

FIG. 25A illustrates an example of the case in which N=1. That is, only feedback information of one PSSCH may be included in one PSFCH, and may be transmitted.

FIG. 25B illustrates an example of the case in which N=2. As described in the (2-1)th embodiment, if only one PSFCH includes feedback information for one PSSCH, the maximum number of PSFCHs to be transmitted through one slot in FIG. 25B may be greater than in FIG. 25A. In this case, the probability of collision of the PSFCH between different terminals may increase.

FIG. 25C illustrates an example of the case in which N=2. Unlike FIG. 25B, the PSSCH resource allocation unit is increased. In this case, since the maximum number of PSSCHs that can be transmitted in the system frequency band may be reduced, the maximum number of PSFCHs to be transmitted through one slot is less than in FIG. 25B, and may be the same as the case of FIG. 25A. In this case, the probability of collision of the PSFCH between different terminals may be reduced than the case of FIG. 25B.

For example, the allocation unit of the PSSCH in the case where N=1 may be referred to as one sub-channel. In the above, the sub-channel may be a set or bundle of one or more consecutive PRBs. The size of the sub-channel or the number of sub-channels in the resource pool may be configured by a base station or may be pre-configured.

Fourth Embodiment

A fourth embodiment provides a method and apparatus for exchanging, by a terminal, a capability of transmitting or receiving a feedback channel through a sidelink with another terminal or a base station and performing communication with another terminal through the sidelink based on the capability.

In side-link signal transmission or reception, the terminal may share information (UE capability) on whether or not the type of PSFCH format transmitted or received by the terminal itself is supportable, with another terminal or a base station. As another information, information on the number of PSFCHs that can be simultaneously transmitted or received by the terminal itself can be shared with another terminal or base station.

In the case of transmitting and receiving signals to or from another terminal through the sidelink, the sidelink is available to transmit or receive signals through one of unicast, groupcast, and broadcast methods. In the case where a terminal performs unicast or groupcast with another terminal, UE capability exchange with another terminal may be performed through PC5-RRC signaling. In addition, a procedure for exchanging UE capability may be a method in which one terminal requests (inquires) transmission of UE capability from another terminal, or one terminal first delivers its UE capability to another terminal.

Fifth Embodiment

A fifth embodiment provides a method for transmitting feedback in the case where simultaneous transmission or reception through multiple sidelink carriers is available using carrier aggregation (CA) on the sidelink. Various types of scenarios can be supported in various methods as follows.

Method 1: In the case where sidelink transmission through multiple sidelink carriers by one terminal is available, data may be transmitted to one terminal or multiple terminals through multiple carriers, and HARQ-ACK feedback for the transmitted data may be delivered from a reception terminal or reception terminals. The received HARQ-ACK feedback may be transmitted together or preferentially to a base station.

Method 2: The sidelink is available for one terminal to communicate with one terminal through multiple sidelink carriers. For example, UE 1 performs unicast communication with UE 2, and may perform data transmission or reception while performing sidelink CA through two sidelink carriers. In method 2, HARQ-ACK for data transmitted through two sidelink carriers may be fed back to a terminal that has transmitted data through one sidelink carrier. That is, even if data is transmitted to multiple sidelink carriers, HARQ-ACK feedback is transmitted through one carrier. The selection of the sidelink carrier through which the HARQ-ACK feedback is transmitted may be determined by one or more combinations among the following methods.

Method a1: HARQ-ACK feedback is transmitted through a sidelink carrier in which a resource pool for which a PSFCH resource is configured exists.

Method a2: HARQ-ACK feedback is transmitted through a sidelink carrier in which a PSFCH resource appears first.

Method a3: HARQ-ACK feedback is transmitted through a sidelink carrier having a low index.

Method a4: HARQ-ACK feedback is determined based on processing time at which a terminal processes the PSSCH.

Method a1 to method a4 described above may be applied to the case where transmission or reception, by a terminal, is available in a plurality of resource pools through one carrier. For example, in the case where data is transmitted to one reception terminal or a plurality of reception terminals in two resource pools and HARQ-ACK feedback for the data is simultaneously transmitted, it may be considered that the feedback is not transmitted from each of the two resource pools but be transmitted from one resource pool. That is, in the case where data is transmitted from multiple resource pools, HARQ-ACK feedback for data may be transmitted from one specific resource pool.

Sixth Embodiment

A sixth embodiment provides a method for indicating whether data, other than HARQ process ID configuration and CSI, exists, in the case where channel state information, which is channel measurement information through a sidelink, is transmitted from one terminal to another terminal by using a MAC control element (MAC CE).

Figure 26:
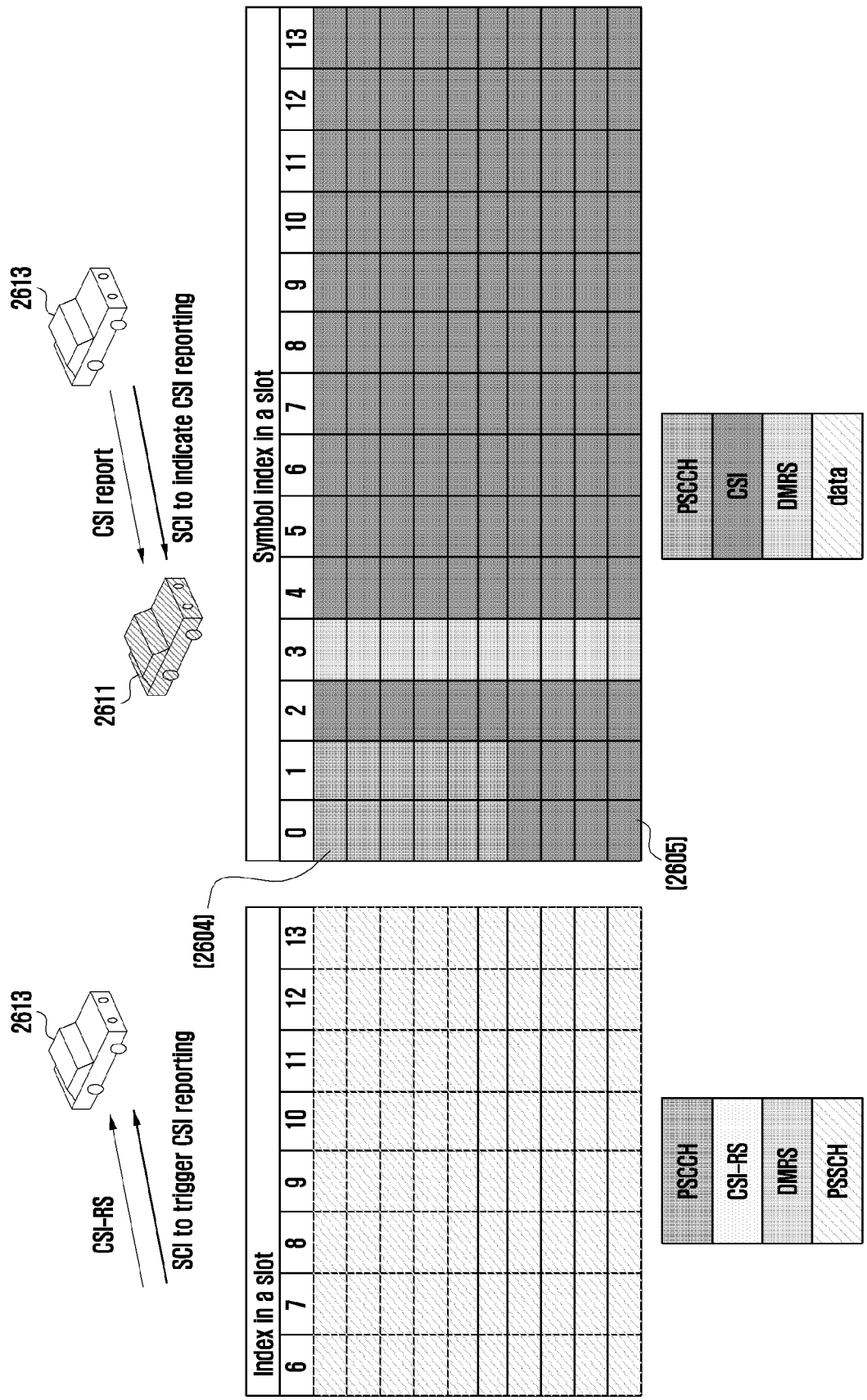
FIG. 26 illustrates an example of a slot structure in case that a CSI-RS is transmitted and an example of a slot structure in case that CSI information is reported.

FIG. 26 illustrates an example of a slot structure in the case where CSI-RS is transmitted and an example of a slot structure in the case of reporting CSI information.

If a CSI-RS 2603 is transmitted, a transmission terminal 2611 transmits a SCI 2601 and a PSSCH 2602 together with the CSI-RS 2603. The SCI 2601 may be mapped to the PSCCH and transmitted. The SCI 2601 may include a QoS value corresponding to the PSSCH 2602. A reception terminal 2613 measures the transmitted CSI-RS 2603 for a sidelink to identify a channel state, generates CSI information for the sidelink, and transmits the CSI information to a transmission terminal 2611. In the case of reporting the CSI information, the CSI information is mapped to the PSSCH 2605 and transmitted, and the SCI 2604 is also transmitted in order to schedule the PSSCH 2605. The SCI 2604 may be mapped to the PSCCH and transmitted. The SCI 2604 may include a QoS value, and the value may be the same as the QoS value included in the SCI 2601 used at the time of transmitting the CSI-RS 2603. If the CSI information, which is the channel state information, is included in the MAC CE and is transmitted, and if only the CSI is included in the MAC CE without other data and transmitted, the QoS value corresponding to the MAC CE may be determined as the QoS value included in the SCI at the time of transmission of the CSI-RS 2603 used for CSI measurement. In the case where CSI feedback is mapped to the MAC CE or PC5-RRC and transmitted to PSSCH, since the CSI feedback corresponds to SL-SCH, the CSI feedback may be seen as normal data in the physical layer. In this case, the LDPC code may be applied to the CSI like the normal data.

If a situation where the CSI is transmitted to the MAC CE, if there is no other data, a terminal for transmitting the CSI may notify a terminal for receiving the CSI that there is no other data in the SCI scheduling the CSI. The notification may be transmitted to the SCI via one-bit field. In this case, the bit field may be considered in the following situations.

Situation 1: An operation (channel sensing) of finding an empty channel (frequency-time resource) in order to transmit data. For example, if the PSSCH includes only the SCI in a situation where the reception terminal receives the PSSCH, the corresponding PSSCH and the SCI information obtained by scheduling the PSSCH may be ignored or may not be considered at the time of the channel sensing.

Situation 2: In the case of measuring channel busy ratio (CBR), which is information about whether other terminals occupy a channel or a resource pool, for example, if the corresponding PSSCH includes only the SCI in a situation where the reception terminal receives the PSSCH from another terminal, the corresponding PSSCH and the SCI information obtained by scheduling the PSSCH may be ignored or may not be considered at the time of the CBR calculation.

Situation 3: In the case of measuring a channel occupancy ratio (CR), which is information about whether a terminal itself occupies a channel or resource pool, for example, if the corresponding PSSCH includes only the SCI in a situation where a transmission terminal itself transmits the PSSCH, resources occupied by the PSSCH including only the CSI may be ignored or may not be considered at the time of calculation of the CR.

For convenience of explanation, the first to sixth embodiments of the disclosure are divided and described, but since each embodiment includes operations related to each other, a combination of at least two embodiments may be available.

Figure 27:
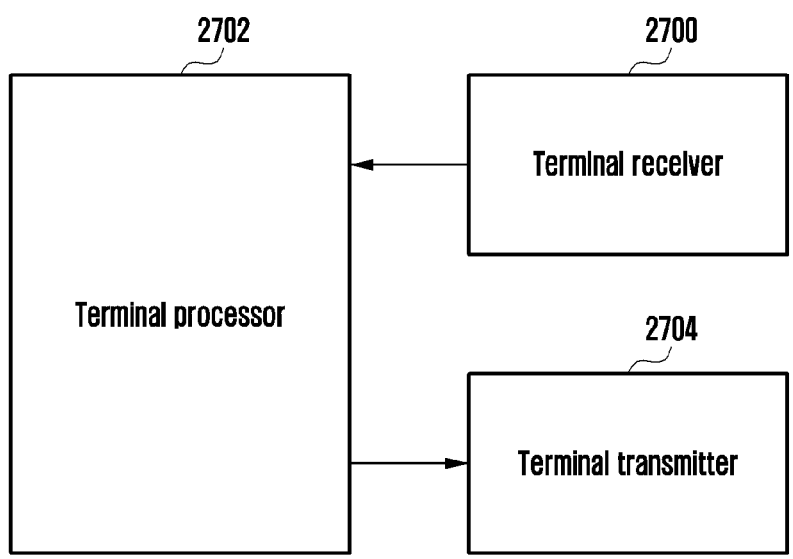
FIG. 27 is a block diagram illustrating an internal structure of a terminal according to an embodiment.
Figure 28:
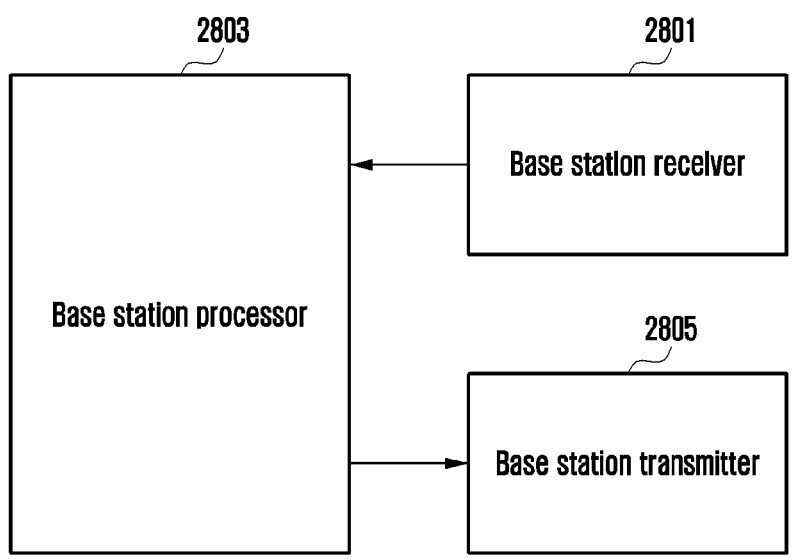
FIG. 28 is a block diagram illustrating an internal structure of a base station according to an embodiment.

In order to perform the embodiments described above, a transmitter, a receiver, and a processor of a terminal and a base station are illustrated in FIGS. 27 and 28, respectively. According to the first to sixth embodiments, a method for transmission or reception between a base station and a terminal or a method for transmission or reception between a transmission terminal and a reception terminal is shown in order to configure HARQ-ACK feedback information, determine whether to transmit HARQ-ACK feedback, and perform an operation of feedback transmission. In order to perform the method, the receiver, the processing unit, and the transmitter of the base station and the terminal need to operate according to embodiments.

Specifically, FIG. 27 is a block diagram illustrating an internal structure of a terminal according to an embodiment. As illustrated in FIG. 27, a terminal according to the disclosure may include a terminal receiver 2700, a terminal transmitter 2704, and a terminal processor 2702. The terminal receiver 2700 and the terminal transmitter 2704 may be collectively referred to as a transceiver in an embodiment. The transceiver may transmit or receive a signal to or from a base station. The signal may include control information and data. To this end, the transceiver may include a RF transmitter configured to up-convert and amplify the frequency of a transmitted signal, a RF receiver configured to perform low-noise amplification of a received signal and down-convert the frequency of the signal, and the like. The transceiver may receive a signal through a wireless channel, then output the received signal to the terminal processor 2702, and transmit a signal output from the terminal processor 2702, through a wireless channel. The terminal processor 2702 may control a series of procedures to allow the terminal to be operated according to the aforementioned embodiments. For example, the terminal receiver 2700 receives control information from the base station, and the terminal processor 2702 determines whether to transmit HARQ-ACK feedback and pieces of feedback information according to the control information and preconfigured configuration information, and may prepare the transmission accordingly. Thereafter, the terminal processor 2702 may transmit feedback scheduled in the terminal transmitter 2704 to the base station.

In the above embodiments, SCI transmission has been described under the assumption of a single stage SCI method (or one stage SCI). That is, the single stage SCI method is a method in which a reception terminal decodes one SCI for scheduling the PSSCH in order to decode the PSSCH. However, a two-stage SCI method may also be considered in order to perform sidelink operation. That is, the two-stage SCI method is a method in which, in order for the reception terminal to decode the PSSCH, two SCIs related to scheduling need to be decoded, and thus the scheduling information can be identified. The two-stage SCI method may be applied to reduce overhead or reduce the number of blind decoding. According to the embodiments, it has been described under the assumption of a single stage SCI method, that is, for example, it has been described as a method in which SCI is transmitted through a PSCCH. However, in the two-stage SCI method, the first SCI is transmitted through the PSCCH, and the second SCI is transmitted through the PSSCH, and thus the reception terminal can decode the PSSCH. It may be considered that, in the two-stage SCI method, the first SCI and the second SCI are transmitted through separate PSCCHs, respectively.

FIG. 28 is a diagram illustrating an internal structure of a base station, according to an embodiment. As illustrated in FIG. 28, a base station according to the disclosure may include a base station receiver 2801, a base station transmitter 2805, and a base station processor 2803. The base station receiver 2801 and the base station transmitter 2805 may be collectively referred to as a transceiver in an embodiment. The transceiver may transmit or receive a signal to or from a terminal. The signal may include control information and data. In order to transmit or receive a signal, the transceiver may include a RF transmitter configured to up-convert and amplify the frequency of a transmitted signal, a RF receiver configured to perform low-noise amplification on a received signal and down-convert the frequency of the signal, and the like. The transceiver may receive a signal through a wireless channel, then output the received signal to the base station processor 2803, and transmit a signal output from the base station processor 2803, through a wireless channel. The base station processor 2803 may control a series of procedures to allow the base station to be operated according to the aforementioned embodiments. For example, the base station processor 2803 may configure control information according to HARQ-ACK feedback information of a terminal that the base station needs, and control to receive feedback according to the control information. Thereafter, the base station transmitter 2805 transmits the related scheduling control information, and the base station receiver 2801 receives feedback information together with scheduling information.

On the other hand, the embodiments of the disclosure disclosed in this specification and the drawings are merely to provide a specific example in order to easily explain the technical content of the disclosure and to help understanding of the disclosure, and are not intended to limit the scope of the disclosure. That is, it would be obvious to a person skilled in the art which other modifications based on the technical idea of the disclosure can be practiced. In addition, each of the above embodiments can be operated in combination with each other as necessary. In addition, the above embodiments may be implemented in other modifications, based on the technical idea of the above embodiment, of LTE system, 5G system, and the like.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal for feeding back a hybrid automatic repeat request (HARQ) in a communication system, the method comprising:
    generating HARQ feedback information for data that is scheduled for the terminal in at least one slot;
    determining a transmission timing of the HARQ feedback information based on a minimum processing time for transmission of a physical sidelink feedback channel (PSFCH) of the terminal; and
    transmitting the HARQ feedback information based on the determined timing,
    wherein the minimum processing time for the PSFCH transmission is determined based on at least one of a subcarrier spacing, a configuration of a resource pool, or a time interval between a PSSCH and the PSFCH,
    wherein a maximum number of bits of the HARQ feedback information is determined based on N and K, and
    wherein N corresponds to a period in which a PSFCH resource is configured, and K corresponds to the minimum processing time for the PSFCH transmission.

2. The method of claim 1, wherein the minimum processing time for the PSFCH transmission is determined based on whether the configuration for the resource pool is a configuration for unicast transmission or a configuration for groupcast transmission.

3. The method of claim 1, wherein the minimum processing time for the PSFCH transmission is determined based on a last symbol of the PSSCH and a first symbol of the PSFCH.

4. The method of claim 1, wherein the transmitting of the HARQ feedback information comprises:
in case that a plurality of PSFCHs are to be transmitted, determining a PSFCH to be transmitted among the plurality of PSFCHs, based on a sequence of PSSCHs corresponding to the plurality of PSFCHs or a quality of service (QoS) of the PSSCH.

5. The method of claim 1, wherein the transmitting of the HARQ feedback information comprises,
in case that a plurality of PSFCHs are to be transmitted, determining transmission powers of the PSFCHs, and adjusting the transmission powers of the PSFCHs according to a preconfigured ratio in case that a sum of the transmission powers of the PSFCHs exceeds a maximum available power of the terminal.

6. The method of claim 1, wherein the transmitting of the HARQ feedback information comprises,
in case that a plurality of PSFCHs are to be transmitted, determining a PSFCH to be transmitted based on at least one of a number of HARQ feedback bits of each PSFCH or information on whether the PSFCH is feedback transmission for groupcast transmission.

7. The method of claim 1, wherein the maximum number of bits of the HARQ feedback information is determined to be (N+K−1).

8. The method of claim 1, wherein a minimum number of bits of the HARQ feedback information is determined to be a larger value between (N—K+1) and 0.

9. The method of claim 1, wherein a PSFCH corresponding to unicast transmission is transmitted prior to a PSFCH corresponding to groupcast transmission, in case that a plurality of PSFCHs are transmitted for PSSCHs transmitted from different terminals.

10. The method of claim 1, wherein a frequency band of the PSFCH is configured to be larger than a frequency band of the PSSCH.

11. A terminal for feeding back a hybrid automatic repeat request (HARQ) in a communication system, the terminal comprising:
a transceiver; and
a controller configured to:
generate HARQ feedback information for data that is scheduled for the terminal in at least one slot,
determine a transmission timing of the HARQ feedback information based on a minimum processing time for transmission of a physical sidelink feedback channel (PSFCH) of the terminal, and
transmit, via the transceiver, the HARQ feedback information based on the determined transmission timing,
wherein the minimum processing time for the PSFCH transmission is determined based on at least one of a subcarrier spacing, a configuration of a resource pool, or a time interval between a PSSCH and the PSFCH,
wherein a maximum number of bits of the HARQ feedback information is determined based on N and K, and
wherein N corresponds to a period in which a PSFCH resource is configured, and K corresponds to the minimum processing time for the PSFCH transmission.

12. The terminal of claim 11, wherein the minimum processing time for the PSFCH transmission is determined based on whether the configuration for the resource pool is a configuration for unicast transmission or a configuration for groupcast transmission.

13. The terminal of claim 11, wherein the minimum processing time for the PSFCH transmission is determined based on a last symbol of the PSSCH and a first symbol of the PSFCH.

14. The terminal of claim 11, wherein the terminal is configured to, in case that a plurality of PSFCHs are to be transmitted, determine a PSFCH to be transmitted among the plurality of PSFCHs, based on a sequence of PSSCHs corresponding to the plurality of PSFCHs or a quality of service (QoS) of the PSSCH.

15. The terminal of claim 11, wherein the terminal is configured to, in case that a plurality of PSFCHs are to be transmitted:
determine transmission powers of the PSFCHs; and
adjust the transmission powers of the PSFCHs according to a preconfigured ratio in case that a sum of the transmission powers of the PSFCHs exceeds a maximum available power of the terminal.

16. The terminal of claim 11, wherein the terminal is configured to, in case that a plurality of PSFCHs are to be transmitted:
determine a PSFCH to be transmitted based on at least one of a number of HARQ feedback bits of each PSFCH or information on whether the PSFCH is feedback transmission for groupcast transmission.

17. The terminal of claim 11, wherein the maximum number of bits of the HARQ feedback information is determined to be (N+K−1).

18. The terminal of claim 11, wherein a minimum number of bits of the HARQ feedback information is determined to be a larger value between (N−K+1) and 0.

19. The terminal of claim 11, wherein a PSFCH corresponding to unicast transmission is transmitted prior to a PSFCH corresponding to groupcast transmission, in case that a plurality of PSFCHs are transmitted for PSSCHs transmitted from different terminals.

20. The terminal according to claim 11, wherein a frequency band of the PSFCH is configured to be larger than a frequency band of the PSSCH.

* * * * *